(12) United States Patent
Komuro et al.

(10) Patent No.: US 6,530,141 B2
(45) Date of Patent: Mar. 11, 2003

(54) METHOD OF FORMING THIN FILM MAGNETIC RECORDING HEAD WITH NARROW TRACK WIDTH PERFORMING HIGH DENSITY RECORDING AT HIGH DRIVING FREQUENCY

(75) Inventors: Matahiro Komuro, Hitachi (JP); Tomohiro Okada, Hitachi (JP); Moriaki Fuyama, Hitachi (JP); Tetsuo Ito, Mito (JP); Hiroshi Fukui, Hitachi (JP); Yohji Maruyama, Iruma (JP); Miki Hara, Kokubunji (JP); Hisashi Takano, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/879,974

(22) Filed: Jun. 14, 2001

(65) Prior Publication Data

US 2001/0027603 A1 Oct. 11, 2001

Related U.S. Application Data

(63) Continuation of application No. 09/616,907, filed on Jul. 14, 2000, now abandoned, which is a continuation of application No. 09/048,985, filed on Mar. 27, 1998, now Pat. No. 6,091,582.

(30) Foreign Application Priority Data

Mar. 28, 1997 (JP) .............................................. 9-77173
Apr. 22, 1997 (JP) ............................................ 9-104230

(51) Int. Cl.⁷ .......................... G11B 5/127; H04R 31/00
(52) U.S. Cl. ................. 29/603.14; 29/603.07; 29/603.13; 29/603.14; 29/603.23; 204/192.1; 205/183; 360/119; 360/126; 360/314; 360/324
(58) Field of Search .......................... 29/603.07, 603.14, 29/603.13, 603.23; 360/126, 317, 119, 324; 204/192.1; 205/183

(56) References Cited

U.S. PATENT DOCUMENTS

| 5,135,468 A | * | 8/1992 | Meissner ...................... 600/28 |
| 5,802,700 A | * | 9/1998 | Chen et al. .............. 29/603.14 |
| 5,850,326 A | * | 12/1998 | Takano et al. ............... 360/122 |

* cited by examiner

Primary Examiner—Peter Vo
Assistant Examiner—Donghai D. Nguyen
(74) Attorney, Agent, or Firm—Antonelli, Terry, Stout & Kraus, LLP

(57) ABSTRACT

A method of forming a thin film magnetic head, including forming a first magnetic layer, forming a second magnetic layer as a magnetic flux passage in combination with the first magnetic layer, and forming a laminate structure body between the first magnetic layer and the second magnetic layer. The forming of the laminate structure body includes forming a third magnetic layer, a fourth magnetic layer and a non-magnetic conductive layer between the third magnetic layer and the fourth magnetic layer, projecting the laminate structure body more toward an air bearing surface than a projection of the first magnetic layer and the second magnetic layer toward the air bearing surface, and providing the laminate structure body with a width which is smaller than a width of the first magnetic layer and the second magnetic layer.

12 Claims, 15 Drawing Sheets

METHOD OF FORMING THIN FILM MAGNETIC RECORDING HEAD WITH NARROW TRACK WIDTH PERFORMING HIGH DENSITY RECORDING AT HIGH DRIVING FREQUENCY

CROSS REFERENCE TO RELATED APPLICATION

This is a continuation of U.S. application Ser. No. 09/616,907, filed Jul. 14, 2000, now abandoned which is a continuation of U.S. application Ser. No. 09/048,985, filed Mar. 27, 1998, now U.S. Pat. No. 6,091,582, the subject matter of which is incorporated by reference herein.

BACKGROUND OF THE INVENTION

The present invention relates to a novel thin film magnetic head, a recording/reproduction separation type head using the thin film magnetic head, and a magnetic recording and reproducing apparatus.

A thin film magnetic head for a magnetic disk apparatus is formed on a slider held above a disk which rotates at high speed. The magnetic head has a magnet pole layer in the form of a thin film made of a ferromagnetic material. On an air bearing surface (ABS), a lower magnetic pole layer and an upper magnetic pole layer are provided on and under a gap layer. The upper and lower magnetic pole layers of the recording head are in contact with each other in the rear part of the gap. In order to increase the recording density, it is necessary to write a large amount of data on the surface of a magnetic disk. For this purpose, it has been proposed to narrow the track width, thereby increasing the recording density. A method which provides a thin film magnetic head having a width at the magnetic pole end, that is, a track width, of 2 $\mu$m or narrower is described in Japanese Patent Application Laid-Open No. 7-296328. According to the method described in this publication, when a magnetic film is formed by plating, a silicon dioxide layer is used as a plating frame. It is described in the publication that the magnetic pole layers from the ABS to the zero throat level in the rear part are wider than a magnetic pole end layer and are in parallel, and that a parallel path is formed for receiving and transferring the magnetic flux from/to the magnet pole end region, thereby enhancing the magnetic flux transmitting ability. Further, the shape of the upper magnetic film (shown by P2(T) in FIG. 24 and P2 in FIG. 25) is clearly shown in the head construction diagram of FIGS. 24 and 25 of the publication. The cross-sectional area of the upper magnetic film is constant, when it is seen from the air bearing surface at the gap depth position (upper part of the frame).

It is an object of the invention to provide a thin film magnetic head with less blur having a high recording magnetic field, and a recording/reproduction separation type magnetic head using the thin film magnetic head as well as a magnetic recording and reproducing apparatus.

It is another object of the invention to provide a high-frequency driven magnetic head having a magnetic pole width of 1 $\mu$m or narrower and a magnetic recording and reproducing apparatus which uses the magnetic head and has a very high recording density.

SUMMARY OF THE INVENTION

According to the invention, there is provided a thin film magnetic head having an upper magnetic film and a lower magnetic film disposed on either side of a non-magnetic gap film, wherein on at least one of the upper and lower magnetic films, an upper end part magnetic film is formed on the upper magnetic film and a lower end part magnetic film is formed on the lower magnetic film via the magnetic gap at the ends in which the magnetic gap is formed on the magnetic gap side.

The invention is also characterized in that a cross-sectional area parallel to the air bearing surface of at least one of the upper and lower end part magnetic films is smaller than the cross-sectional area of the upper and lower magnetic films in a part having the magnetic gap; the track width of at least one of the upper and lower end part magnetic films is narrower than the track width of the upper magnetic film and that of the lower magnetic film; and at least one of the upper and lower end part magnetic films is projected more than the upper and lower magnetic films on the air bearing surface toward the air bearing surface side.

According to the invention, the thin film magnetic head as mentioned above is characterized by either one of the following two features or the combination thereof; i.e., (1) the fact that each of the upper and lower end part magnetic films is constructed by a plated magnetic film having a saturated magnetic flux density of 1.5 tesla or higher and the upper magnetic film is formed by plating or sputtering so as to have the width wider than a frame width of the plated magnetic film and a specific resistance of 50 $\mu\Omega$·cm or higher; and (2) the fact that the upper and lower end part magnetic films have the same track width, an upper shield film for magnetically shielding the upper magnetic film and a magnetic resistive film has a width wider than the track width, and the upper magnetic film is constructed by one or a plurality of multilayered magnetic films.

According to the invention, there is provided a recording/reproduction separation type magnetic head, in which a recording head for writing information and a reproduction head for reading information are integrally formed, wherein the recording head, is constructed in the form of the above mentioned thin film magnetic head.

In the above mentioned recording/reproduction separation type magnetic head according to the invention, the reproduction head includes a ferromagnetic layer having a magnetic resistive effect and an antiferromagnetic layer which is closely attached to the ferromagnetic layer and allows the ferromagnetic layer to exhibit one-way anisotropy, and the antiferromagnetic layer is made of a Cr—Mn alloy.

According to the invention, a magnetic recording/reproduction apparatus, which comprises a thin film magnetic disk, on which information is recorded, rotating means for the thin film magnetic disk, a recording/reproduction separation type magnetic device which is attached to a floating type slider and has a recording head for writing information and a reproduction head for reading information, and moving means for supporting the floating type slider and accessing the thin film magnetic disk; wherein, the magnetic disk, rotating at 4000 rpm or higher for recording and reproduction and having a recording frequency of 45 MHz or higher, is characterized in that it is accessed by a recording/reproduction separation type magnetic head constructed using the foregoing recording/reproduction separation type magnetic head.

Preferably, the invention is applied to a magnetic disk apparatus having a recording density of 4 Gb/in$^2$ or higher When a recording head is seen from the air bearing surface, as shown in FIG. 1, the track width of the magnetic film 1 above the gap is narrowed relative to a track width Tw near the gap, and the upper end part magnetic film 16 shown in FIG. 2 is widened on both sides of the track by the length t of the overhang. A frame member having an undercut is fabricated by the combination of irradiation of ultraviolet rays and far ultraviolet rays and two stages of development of a two-layered film using a photo resist and polydimethylglutarimide; a gap film is formed between the photo resist layers; and the lower magnetic film is undercut.

When a magnetic head having the structure, as shown in FIG. 3 according to the invention, is fabricated, since a frame member made of silicon dioxide or the like is not used, the wear resistance and an apparatus for forming the frame member become unnecessary. Since the upper magnetic film 11 is not exposed to the air bearing surface, as shown in FIG. 3, there is little leakage of the magnetic flux from the upper magnetic film to the air bearing surface, so that blur on the medium can be reduced. As shown in FIG. 6, when the shape of the upper magnetic film is changed in the throat height, the cross-sectional area on the air bearing surface side parallel to the air bearing surface is reduced, which is enlarged from the middle of the throat height. Consequently, the magnetic field which leaks from the upper magnetic film 11 to the air bearing surface is reduced, and the magnetic field which leaks from the upper magnetic film 11 via the upper end magnetic film 17 can be increased. The head can be used for a magnetic recording apparatus of high recording density having a surface recording density of 4 $Gb/in^2$ or higher. It is very important for the narrow track head to have a reduced overhang t near the air bearing surface of the upper magnetic film. In accordance with the invention, by setting the overhang at five times or smaller of the thickness of the gap film 17, the blur is reduced.

As an example, in the case where the track width (Tw) is 1.0 $\mu$m, the thickness (pu) of the upper magnetic film is 4 $\mu$m and the thickness of the gap film is 0.2 $\mu$m, the relation between the magnetic field H which leaks from the end of the upper magnetic film 11 and the overhang t is as shown in FIG. 7. The smaller the leakage magnetic field is, the better. However, as the overhang t is reduced, the magnetic field strength near the gap on the air bearing surface decreases when the thickness of the upper magnetic film is made constant. In order to increase the magnetic field strength and to reduce the leakage magnetic field, a range of t in which H≦1000 Oe in this case, that is, t≦1 $\mu$m, is desirable and a value of five times as thick as the thickness (0.2 $\mu$m) of the gap film or smaller is desirable. In order to enhance the magnetic field strength when t≦1 $\mu$m, it is sufficient to increase the thickness of the upper magnetic film 11. When the thickness of the upper magnetic film 11 is increased, the shape and the accuracy of a plating frame for forming the upper magnetic film 11 become a problem. That is, when the plating frame becomes thick, it is difficult to control the shape thereof and the accuracy of positioning relative to the magnetic film (upper end part magnetic film 16) thereunder becomes a problem. Consequently, from the point of view of the shape and the accuracy of the plating frame, it is difficult to realize t=0 $\mu$m. It is preferable to select t=0.05 to 0.1 $\mu$m and increase the thickness of the upper magnetic film 11. The above described example relates to the case where the upper magnetic film 11 is spaced from the air bearing surface by 10 nm. However, if the upper magnetic film 11 is spaced from the air bearing surface by more than 10 nm, the magnetic field on the air bearing surface from the upper end part magnetic film is reduced. By changing the structure of the conventional recording head, as shown in FIG. 2, according to the structure of the invention, as shown in FIG. 3, the erasure of recording data and undesirable influence on adjacent tracks due to the magnetic field leaking from the upper end part magnetic film are prevented. Effects similar to those of the structure as shown in FIG. 3 can be obtained by enlarging the cross-sectional area of the upper magnetic film 11 in a position less than the gap depth (the width of the gap film in FIG. 3 from the air bearing surface) which is spaced from the air bearing surface and by reducing the cross-sectional area on the air bearing surface.

According to the invention, a magnetic pole end part of the recording head of the thin film magnetic head is fabricated by frame plating. That is, the three kinds of films which make up the upper end part magnetic film 16, the gap film 17 and the lower end part magnetic film 18, as shown in FIGS. 2 and 3, are plated by using the same frame. The upper magnetic film 11 as shown in FIGS. 2 and 3 is in contact with the upper end part magnetic film 16 on the air bearing surface side. According to the conventional structure, the shape of the upper end part magnetic film 16 is as shown in FIG. 2 in cross section in the vertical direction to the air bearing surface and is as shown in FIG. 4 when seen from above the film face. As shown in FIG. 4, the shape of the gap film 17 and that of the upper end part magnetic film 16 are the same until the gap depth (frame end) from the air bearing surface, and the cross section parallel to the air bearing surface is the same from the air bearing surface to the gap depth (cross section of the location where the gap film exists). In contrast to the conventional shape as indicated above, as shown in FIG. 5 or 6, the cross-sectional area of the upper end part magnetic film 16 on the air bearing surface side is reduced, whereby the magnetic field leaking from the upper end part magnetic film 16 is reduced on the air bearing surface, so that the recording magnetic field becomes sharp, the magnetic field distribution of the track edge becomes sharp, and the background is reduced.

As an antiferromagnetic film, an oxide nickel film, an iron-manganese alloy thin film, a chromium-manganese, chromium-manganese-platinum, chromium-aluminum alloy film or the like can be used. A hard magnetic film, such as a ferromagnetic cobalt-platinum, cobalt-chromium-platinum or iron-cobalt-terbium alloy film can be also used. The hard magnetic film is a magnetic film whose magnetization is not easily changed by an external magnetic field. Since the direction of magnetization is hardly changed even when a magnetic field of 50 oersted, where the coercive force is for example 100 oersted or larger, is applied, effects similar to those of the antiferromagnetic film can be obtained. That is, as long as a film has a characteristic that one-way anisotropy by a switched connection bias can be applied, when the film is formed so as to be closely attached to another magnetic film, the film does not always have to be antiferromagnetic. It is preferable to use a film generally called a bias film.

As the magnetic film, it is preferable to use an alloy of Ni 70 to 95 at %, Fe 5 to 30 at %, and Co 1 to 5 at % or an alloy of Co 30 to 85 at %, Ni 2 to 30 at % and Fe 2 to 50 at %. In addition, a Permalloy or Permender alloy or the like can be used. That is, it is preferable to use a ferromagnetic material having a preferable soft magnetic characteristic.

Preferably, the non-magnetic conductive film is made of Au, Ag or Cu. Further, Cr, Pt, Pd, Ru, Rh or the like, or an alloy thereof can be also used. That is, it is preferable to use a material which does not have spontaneous magnetization at a room temperature and has preferable permeability of electrons. The thickness of each of the above films is preferably about 2 to 1000 Å.

The invention relates to a magnetic head comprising a coil conductor sandwiched by a first magnetic film and a fourth magnetic film, a second magnetic body magnetically coupled with the first magnetic film and a third magnetic body magnetically coupled with the fourth magnetic film, and a magnetic gap sandwiched between the second magnetic film and the third magnetic film. In the structure for realizing both a high frequency characteristic and narrow tracks, which will be described hereinafter, especially to reduce the manufacturing costs, an insulative and non-magnetic film which is exposed to a sliding face includes at least the first magnetic film.

In order to satisfy the fundamental functions of a magnetic head having the above structure, a part of the third magnetic film is exposed to the non-magnetic and insulative film face, and the third and fourth magnetic films are magnetically coupled.

In order to reduce the manufacturing costs of the magnetic head, at least three sides of each of the second and third magnetic films for forming a magnetic gap are surrounded by a non-magnetic and insulative film, on the surface of which a second non-magnetic and insulative film is deposited, and a coil conductor is provided in the second non-magnetic and insulative film.

In order to reduce the manufacturing costs, the second magnetic film and the third magnetic film have the same two-dimensional shape, and a magnetic pole part for specifying a write track width and a back contact part for magnetically connecting the first and fourth magnetic films are constructed in the laminated structure of the second and third magnetic films.

In order to improve the high frequency characteristic, a coil conductor is arranged on the outside of the region, in which the second and third magnetic films exist.

In order to improve the high frequency characteristic, the specific resistance of the first and fourth magnetic films is made higher than that of the third magnetic film.

In order to improve the high frequency characteristic, the volume of the third magnetic film is made 10E-4 or smaller as compared to the volume of the first and fourth magnetic films.

In order to improve the high frequency characteristic and to allow a write magnetic field of the necessary intensity to be generated, the relation of $0.8 < Bs1 \times t/Bs2 \times Dg < 1.5$ is satisfied, where Bs1 denotes the saturable magnetic flux density of the fourth magnetic film, t the film thickness, Bs2 the saturable magnetic flux density of the third magnetic film and Dg the overlapped length in the floating direction of the third and fourth magnetic films.

In order to reduce the unnecessary write phenomenon to an adjacent track and to realize high density recording, the area of the second and third magnetic films exposed to the air bearing surface of the head is made larger than the area of the first and fourth magnetic films, which are also exposed.

In order to improve the high frequency characteristic, the relation of $\rho/(\mu \times t2) > 0.0064$ is satisfied, where $\rho(\mu\Omega\cdot cm)$ denotes a specific resistance of the material used to form the first and fourth magnetic films, $\mu$ is the relative magnetic permeability at 5 MHz and t ($\mu$m) is the film thickness.

A magnetic head, which satisfies the above mentioned condition, is fabricated and a magnetic recording apparatus is assembled by using the magnetic head.

By supplying a control signal at a driving frequency of 150 MHz or higher to a magnetic recording apparatus having a magnetic head with the improved frequency characteristic, the magnetic recording apparatus can be driven at the above driving frequency.

In order to realize high density recording, the width of the third magnetic film exposed to the sliding surface is made 1.0 $\mu$m or narrower. In order to satisfy the frequency characteristic and the necessary write magnetic field intensity, the thickness is made 1.0 $\mu$m or thinner. Such a magnetic head is fabricated and a magnetic recording apparatus having the magnetic head is assembled.

In order to satisfy the requirements for reliability and the life of a recording apparatus, the first insulative and non-magnetic film as mentioned above is formed of an alumina film or a film containing diamond particles as a main component.

In order to realize both a high frequency characteristic and the necessary write magnetic field intensity, each of the first and fourth magnetic films is composed of a multilayered film, in which a magnetic film and a non-magnetic film are laminated, or a high-electric resistive amorphous alloy film having a specific resistance of 50 $\mu\Omega\cdot$cm or higher. Further, the third magnetic film is formed of an alloy film whose main component is Co—Ni—Fe having a specific resistance of 20 $\mu\Omega\cdot$cm or lower. Moreover, by mounting the magnetic head having the above structure on a recording apparatus, a high-speed and high-density magnetic recording apparatus is realized.

In order to reduce the manufacturing costs and to improve the frequency characteristic, the first and second magnetic films are made of the same material. By mounting the magnetic head on a magnetic recording apparatus, a high-speed magnetic recording apparatus cab be cheaply manufactured.

In order to realize both a reduction in manufacturing costs and the necessary write magnetic field intensity, the saturable magnetic flux density of the third magnetic film is made higher than that of the second magnetic film. This construction is used under the condition that the third magnetic film is positioned on the side of an outflow end along the rotating direction of a medium with respect to the second magnetic film.

DESCRIPTION OF THE EMBODIMENTS

Embodiment 1

Figure 1:
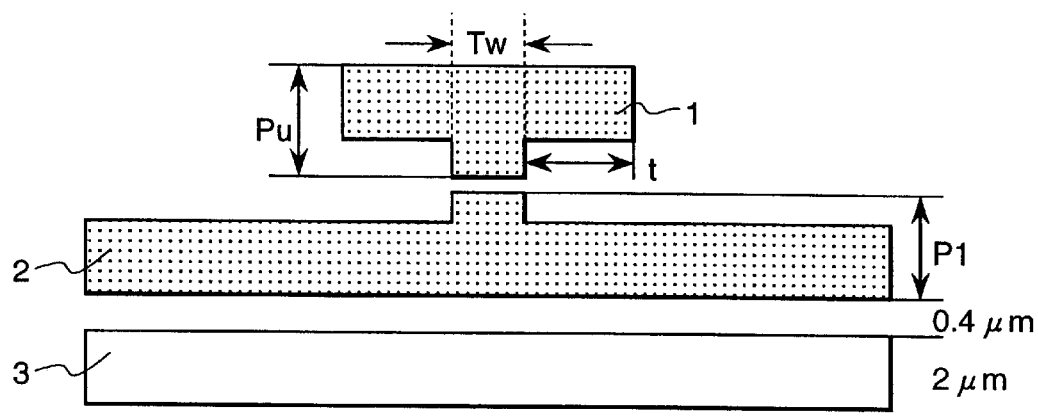
FIG. 1 is a diagram illustrating the shape of a magnetic film, as seen from the air bearing surface side of a magnetic recording head having an overhang.
Figure 2:
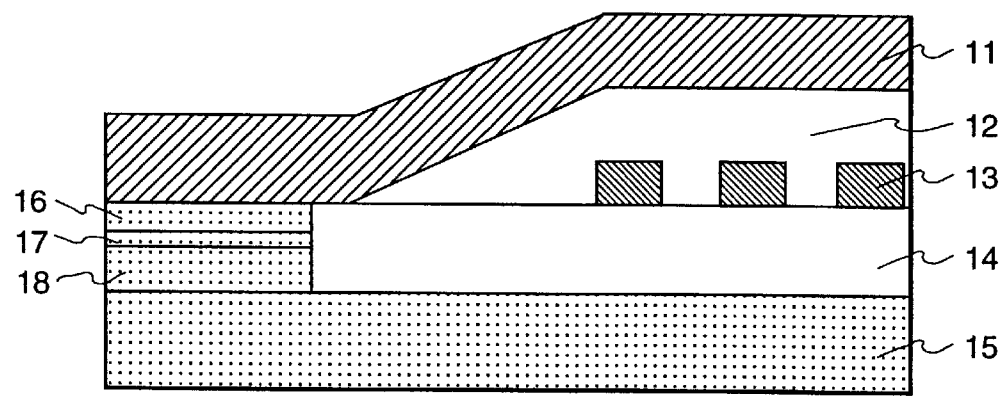
FIG. 2 is a cross section of the magnetic recording head, as seen from a face perpendicular to the air bearing surface.
Figure 3:
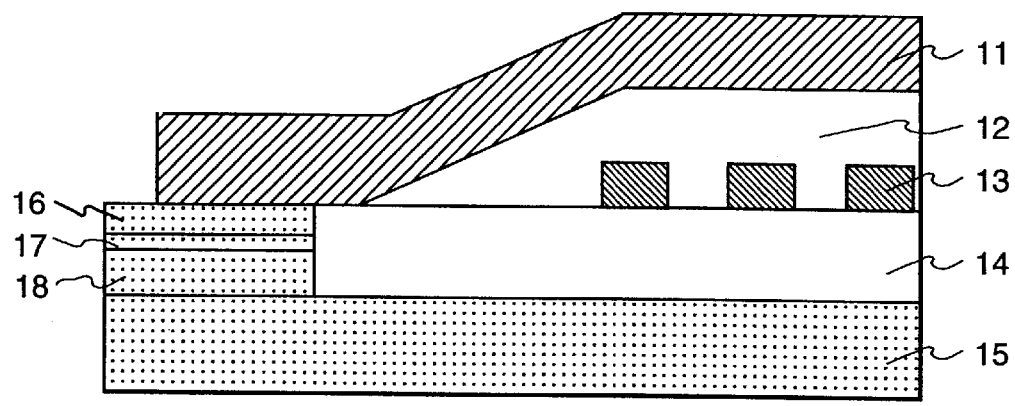
FIG. 3 is a cross section of the magnetic recording head, as seen from a face perpendicular to the air bearing surface.

FIG. 3 shows a cross section of a recording head portion of a recording/reproduction separation type magnetic head of the invention.

As shown in FIG. 3, the invention relates to the recording head. In a thin film magnetic head having an upper magnetic film 11 and lower magnetic film 15 sandwiching a non-magnetic gap film 17, an upper end part magnetic film 16 is formed on the upper magnetic film 11 in the end part where the magnetic gap 17 is formed.

According to the invention, the area of the cross section parallel to the air bearing surface of the upper end part magnetic film 16 is smaller than that of the cross section in the part having the magnetic gap of the upper magnetic film 11.

The track width Tw of the upper end part magnetic film 16 is narrower than the track width Tw of the upper magnetic film 11.

Further, according to the invention, the upper end part magnetic film 16 is projected to the air bearing surface side on the air bearing surface from the upper magnetic film 11.

The thin film magnetic head of the invention comprises the upper end part magnetic film, which is made of a grated magnetic film having a saturable magnetic flux density of 1.5 tesla or higher, and the upper magnetic film having a width wider than the frame width of the plated magnetic film and a specific resistance of 50 $\mu\Omega\cdot$cm or higher, which is formed by plating or sputtering.

Further, according to the invention, the track width of the upper end part magnetic film 16 and that of the lower end part magnetic film 18 are equal, the upper shielding film for magnetically shielding the upper magnetic film and the magnetic resistive film has a width wider than the track width, and the upper magnetic film 11 can be constructed by a multilayered magnetic film.

Although not shown, the invention relates to a recording/reproduction separation type magnetic head in which a recording head for writing information and a reproduction head for reading information are integrally formed.

Figure 4:
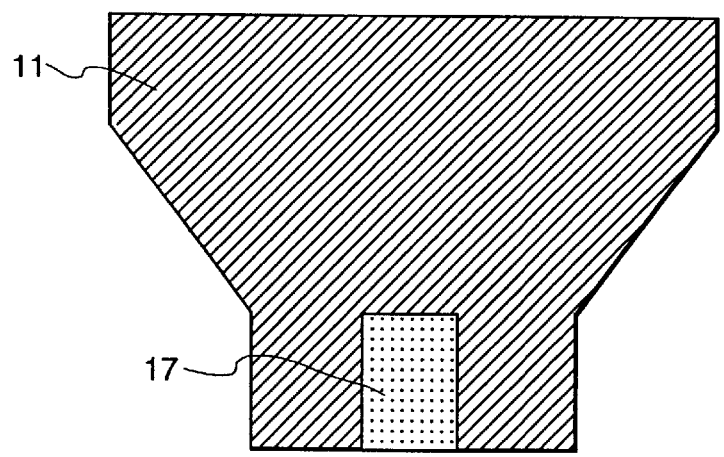
FIG. 4 is a diagram illustrating the shapes of an upper magnetic film and an upper end part magnetic film, as seen from above in a magnetic recording head.
Figure 5:
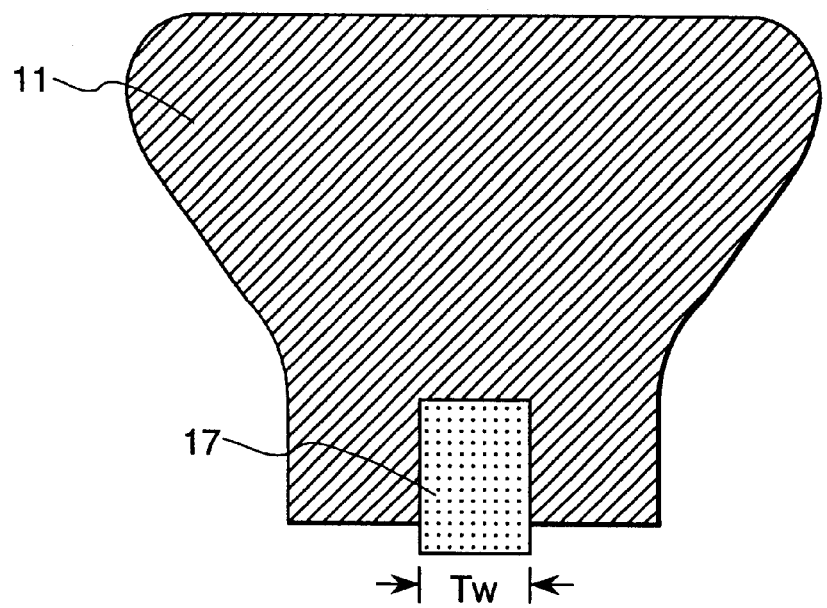
FIG. 5 is a diagram illustrating the shapes of the upper magnetic film and the upper end part magnetic film, as seen from above in a magnetic recording head.

A process for fabricating a recording head according to the invention will be described hereinbelow. Below the lower magnetic film 15, as shown in FIG. 3, a giant magnetic resistive effect head exists via a gap film. The lower magnetic film 15 serves as a shield from the giant magnetic resistive effect head. When a magnetic tunnel spin valve (giant magnetic resistive effect type using an oxide film) head is formed on the underside, it serves as a film available for use as both a shield and an electrode. For these films, a ferromagnetic film having a high permeability is used. A multilayered film of a ferromagnetic material containing Co, Ni, or Fe and an oxide film can be also used. Thereon, a frame is formed by a resist or a resist partially containing an oxide film, and a ferromagnetic film is electrically plated between frames, thereby forming the lower end part magnetic film 18. The throat height is 10 $\mu$m or lower. For this plating film, a Co.Ni.Fe alloy, Co.Fe alloy, Ni Fe alloy or an alloy obtained by adding a metalloid element to one of the above alloys is suitable. The gap film 17 is plated on the lower end part magnetic film 18. For the gap film 17, an alloy such as Cr alloy or an alloy of Ta, W, Ti, Mo or the like is used. On the gap film 17, the upper end part magnetic film 16 is plated. The magnetic characteristic necessary for the plating film which is in contact with the gap film is that the saturable magnetic flux density is high. By using a film having a saturable magnetic flux density of 1.5 T or higher, a recording of 4 Gb/in$^2$ can be achieved. A magnetic film similar to that of the lower end magnetic film 18 may be used as the upper end part magnetic film 16. In order to fabricate a recording head having the construction as shown in FIG. 5, after removing the frame, the lower insulating film 14 is formed, on which coil 13 is formed, and after that, the upper magnetic film is deposited on insulating film 12 by plating or sputtering. The magnetic characteristic necessary for the upper magnetic film is high in specific resistance. The film has to have a specific resistance of 50 $\mu\Omega\cdot$cm or higher and a saturable magnetic flux density of 1.0 T or higher. It was confirmed that when the track width is 0.5 $\mu$m, a recording magnetic field of 2000 Oe or higher was generated by combining the aforesaid characteristic of the plating film and that of the upper magnetic film (it is desirable that the characteristic of the lower magnetic film 15 is the same as that of the upper magnetic film). It was also confirmed that the recording head having the construction of FIG. 5 or 6 has less blur as compared with that of the construction of FIG. 4, while there was no outstanding difference in the recording magnetic field intensity. Since the value of the magnetic field intensity also depends on the saturable magnetic flux density of the upper magnetic film 11, it is desirable that the saturable magnetic flux density of the upper magnetic film is higher. It is confirmed that there is such an effect, when the position on the air bearing face side of the upper magnetic film of the head having the construction of FIG. 5 is spaced from the air bearing face by 10 nm or more. Also in case of FIG. 6, the effect was confirmed, when the position of the upper magnetic film is spaced from the air bearing face by 10 nm. The value of the overhang t lies within a range from 10 nm to 100 µm.

Figure 6:
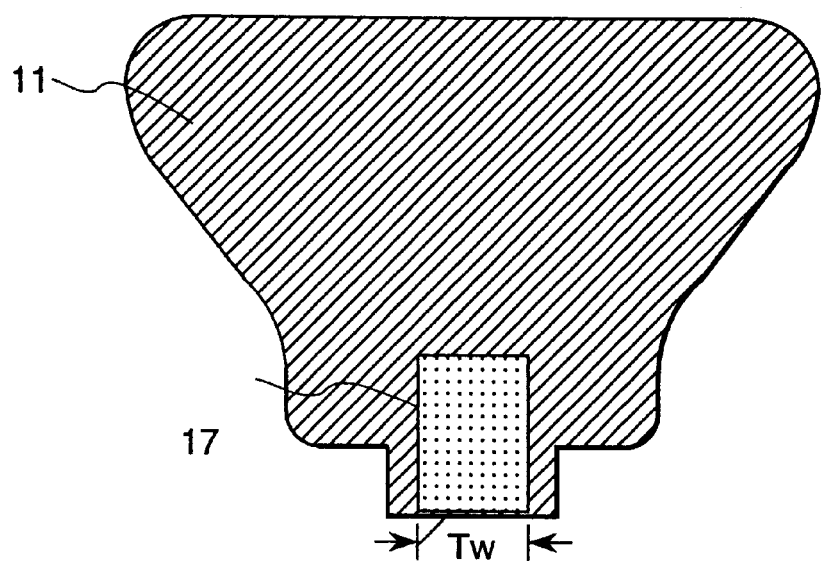
FIG. 6 is a diagram illustrating the shapes of the upper magnetic film and the upper end part magnetic film, as seen from above in a magnetic recording head.
Figure 7:
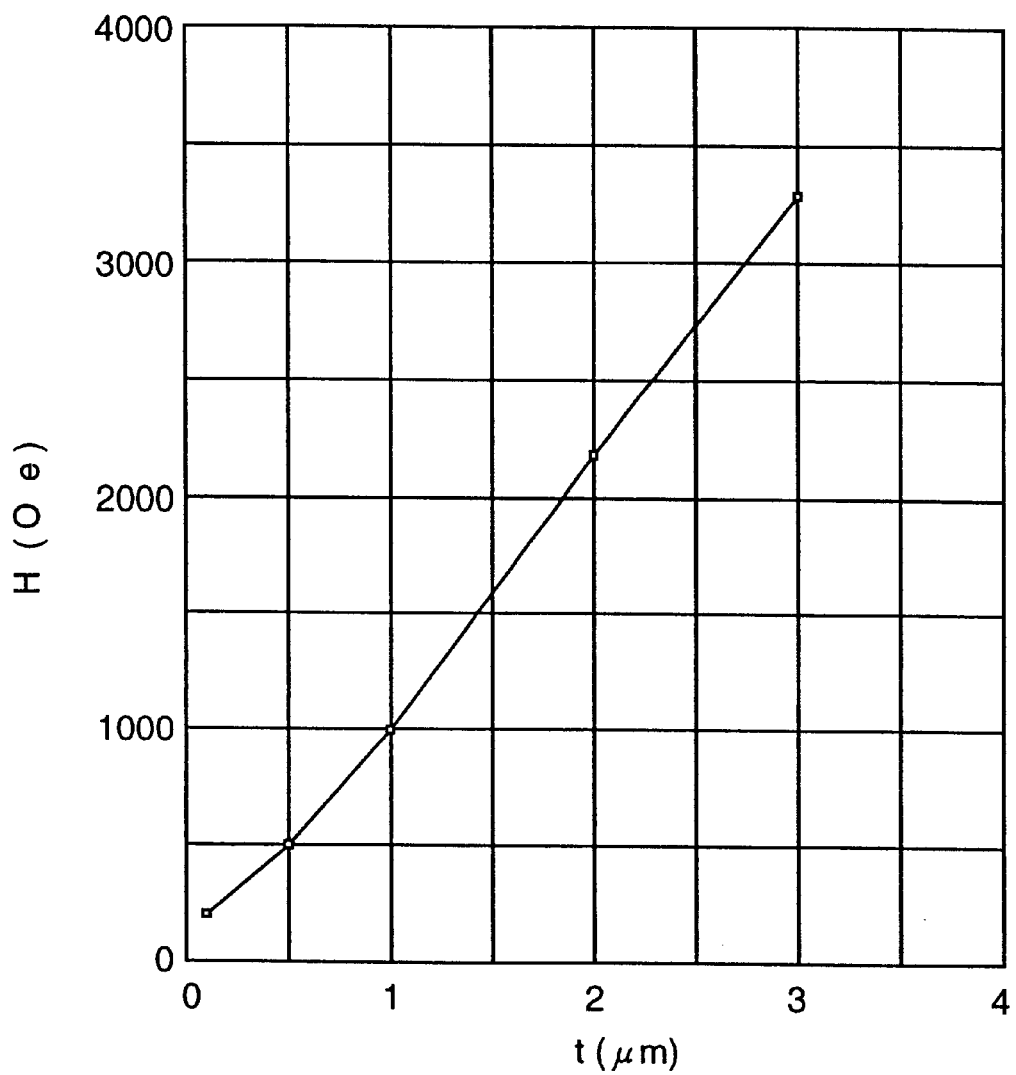
FIG. 7 is a graph showing the relation between the magnetic field (H) and the overhang (t)

As shown in FIGS. 5 and 6, the upper magnetic film 11 has a rounded Erlenmeyer flask shape which is narrowed toward the end part as an air bearing surface.

Figure 8:
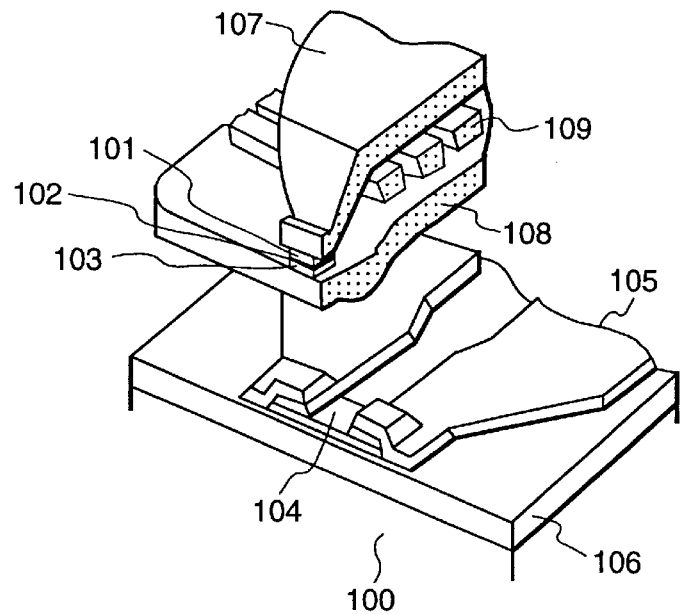
FIG. 8 is a perspective view, partly in cross-section of a part of a recording/reproduction separation type magnetic head.

FIG. 8 is a perspective view showing the construction of the recording/reproduction magnetic head near the air bearing surface. Giant magnetic resistive effect film 104 is arranged between lower shield film 106 and upper shield film 108 via insulating films, and a sense current flows via electrode 105. The recording head is constructed by forming lower end part magnetic film 103, gap film 102, upper end part magnetic film 101, upper magnetic film 107 and coil 109 on the upper shield film 108. The upper magnetic film 107 is formed in a position at a specified depth (10 nm or more) from the air bearing surface. With such a construction, the isomagnetic lines of the magnetic field around the air bearing surface of the gap film 102 are not so greatly influenced by the end part of the upper magnetic film 107, so that a high magnetic field gradient and preferable recording characteristics can be obtained.

In this embodiment, a film having a high specific resistance as described before is used for a recording head, and the recording head and a reproduction head to be described hereinbelow are combined. The giant magnetic resistive effect film 104 is used for a reproduction head, and the electrode 105 for carrying a current is electrically in contact with the giant magnetic resistive effect film 104. Under the electrode 105 and the giant magnetic resistive effect film 104, there is disposed a lower shield film 106 via a lower gap film. On the giant magnetic resistive effect film 104, the lower magnetic film 108 having a high specific resistance to function as the upper shield film is formed via an upper gap film, which is made a part of the lower magnetic pole of the recording head. The high frequency characteristic of the recording head can be improved by using a part of the lower magnetic film 108 having a high specific resistance as a high specific resistance film. It is preferable that the width of the gap film 102 of the recording head is equal to that of each of the upper and lower magnetic films, and that the upper and lower films 101 and 103 having a high saturable magnetic flux density are made of a material having a saturable magnetic flux density higher than the other parts of the magnetic pole. The upper magnetic film 107 having a high specific resistance is formed on the high saturable magnetic flux density film 101. A current is caused to flow in the coil 109 of the recording head and data is recorded in recording medium 110 by the magnetic field from the recording head. A head having another construction using a ferromagnetic tunnel film can be also used as a reproduction head.

Figure 9:
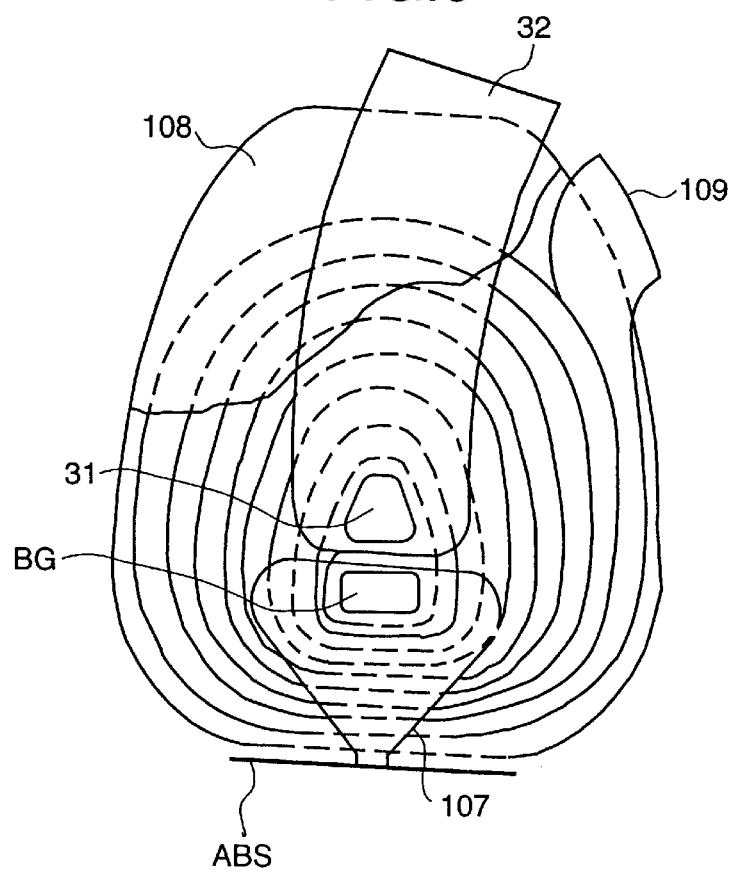
FIG. 9 is a plan view of a thin film magnetic head for recording.

FIG. 9 shows a plan view of the recording head part of FIG. 8, when seen from above. The upper magnetic film 107 has a shape in which the aforesaid upper end part magnetic film is projected on the air bearing surface and has a plane shape of a rounded Erlenmeyer flask in which the end is narrowed. The coil 109 is wound like a spiral as shown in the plan view and is connected to outer lead 32 by connection part 31. The upper shield film 108 serves as a lower part magnetic film. The lower end part magnetic film is formed on the end of the upper shield film 108 in contact with the gap film 102.

Figure 10:
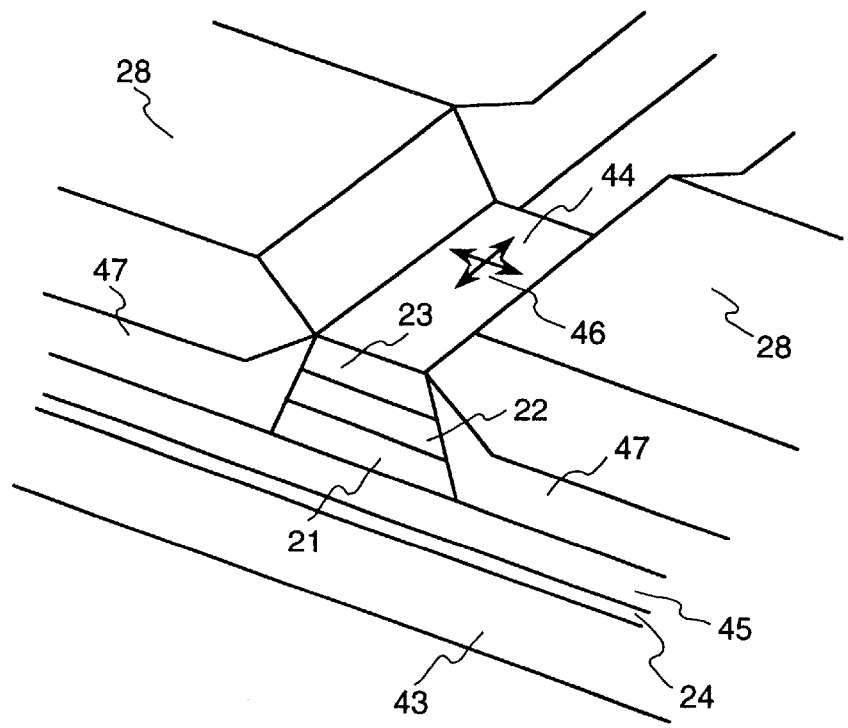
FIG. 10 is a perspective view showing the film construction of a magnetic resistive head.

FIG. 10 is a perspective view of an element having a spin valve magnetic resistive film which is used for the reproduction head of the recording/reproduction separation type magnetic head of the invention.

An MR sensor of the invention has a construction wherein a first magnetic layer 45 of soft ferromagnetic material, a non-magnetic metal layer 21, and a second magnetic layer 22 of ferromagnetic material are deposited on proper substrate 43 made of glass, ceramics or the like. The ferromagnetic layers 45 and 22 are arranged so that their magnetization directions have an angle difference of about 90 degree, when no magnetic field is applied. Further, the magnetization direction of the second magnetic layer 22 is fixed to the same direction as that of the magnetic medium. The magnetization direction of the first magnetic layer 45 of soft ferromagnetic material when no magnetic field is applied is inclined from the magnetization direction of the second magnetic layer by 90 degrees. The magnetization rotation occurs in the first magnetic layer 45 in response to an applied magnetic field.

Figure 11:
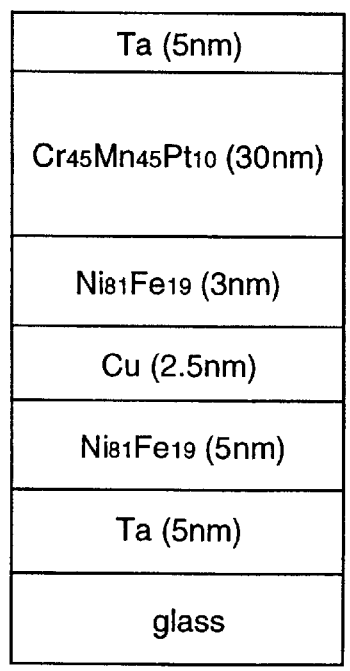
FIG. 11 is a diagram showing the film structure of a magnetic resistive head.

The first magnetic layer 45, the non-magnetic metal layer 21, the second magnetic layer 22 and the antiferromagnetic layer 23 in the embodiment can be constructed according to a laminated construction as shown in FIG. 11, which will be described hereinafter. Hard ferromagnetic layer 47 can be made of $Co_{82}.Cr_9.Pt_9$, $Co_{80}.Cr_8.Pt_9(ZrO_2)_3$ or the like. The film construction of FIG. 16 corresponds to that of the first magnetic layer 45 and the second magnetic layer 22 in the embodiment, and the magnetization directions are the same as described above.

According to the invention, before depositing the first magnetic layer 45 of soft ferromagnetic material, proper lower layer 24 made of Ta, Ru or Crv, for example, is deposited on the substrate 43. The purpose of depositing the lower film 24 is to optimize the structure, crystal grain size and shape of a layer to be deposited later. The shape of the layer is very important in order to obtain a large MR effect. This is because a very thin spacer layer can be used as the non-magnetic metal layer 21, depending on the shape of the layer. In order to minimize the influence caused by a shunt current, it is preferable that the lower electrode has a high electric resistance. The lower layer can also have an inverse structure as mentioned above. The substrate 43 has a sufficiently high electric resistance and is sufficiently flat. In the case where the substrate 43 has a proper crystal construction, the lower film 24 may be unnecessary.

In the first magnetic layer 45, there is used means for generating a bias in the vertical direction for holding a single domain state in the direction parallel to the surface of the drawing. As means for generating a bias in the vertical direction, there can be used the hard ferromagnetic layer 47 having a high saturable coercive force, a high perpendicularity and a high electric resistance. The hard ferromagnetic layer 47 is in contact with the region of the end part of the first magnetic layer 45 of the soft ferromagnetic material. The magnetizing direction of the hard ferromagnetic layer 47 is in parallel to the surface of the drawing.

The antiferromagnetic layers can be adhered to the region of the end part of the first magnetic layer 45, and the necessary bias in the vertical direction is generated. It is preferable that these antiferromagnetic layers have a blocking temperature sufficiently different from that of the antiferromagnetic layer 23 used for fixing the magnetizing direction of the second magnetic layer 22 of the ferromagnetic material.

Preferably, a capping layer made of a material having a high resistance, such as Ta, is applied on the whole MR sensor. Electrode 28 is provided, and circuits are formed among the MR sensor structure, the current source and detecting means.

FIG. 11 shows films constructing a magnetic resistive device of the invention, which are formed in place of the non-magnetic metal layer 21, the second magnetic layer 22 and the antiferromagnetic layer 23, as shown in FIG. 10 and were fabricated as follows by a high-frequency magnetron sputtering apparatus. In an atmosphere of argon at 3 millitorr, the following materials are sequentially deposited on a ceramic substrate having a thickness of 1 mm and a diameter of 3 inches. As sputtering targets, a tantalum, nickel −20 at % iron alloy and a copper, cobalt, chromium −50 at % manganese are used. A chromium-manganese alloy film is produced in such a manner that cm-square chips as an additional element are arranged on the chromium-manganese target and the composition is adjusted by increasing or decreasing the number of chips. When a Co—Fe—Ni layer is formed as a ferromagnetic layer, the composition is adjusted by arranging cm-square chips of nickel and iron on a cobalt target.

The laminated films are formed as follows. High frequency electric power is applied to a cathode, in which each target is arranged, and a plasma is generated in the apparatus. A respective shutter arranged for every cathode is opened and closed sequentially, whereby the layers are sequentially deposited. When the film is formed, a magnetic field of about 30 Oe is applied in parallel to the substrate by using a permanent magnet, thereby obtaining uniaxial anisotropy and leading the direction of an exchange and coupling magnetic field of the chromium-manganese film toward the direction of the applied magnetic field.

Figure 12A:
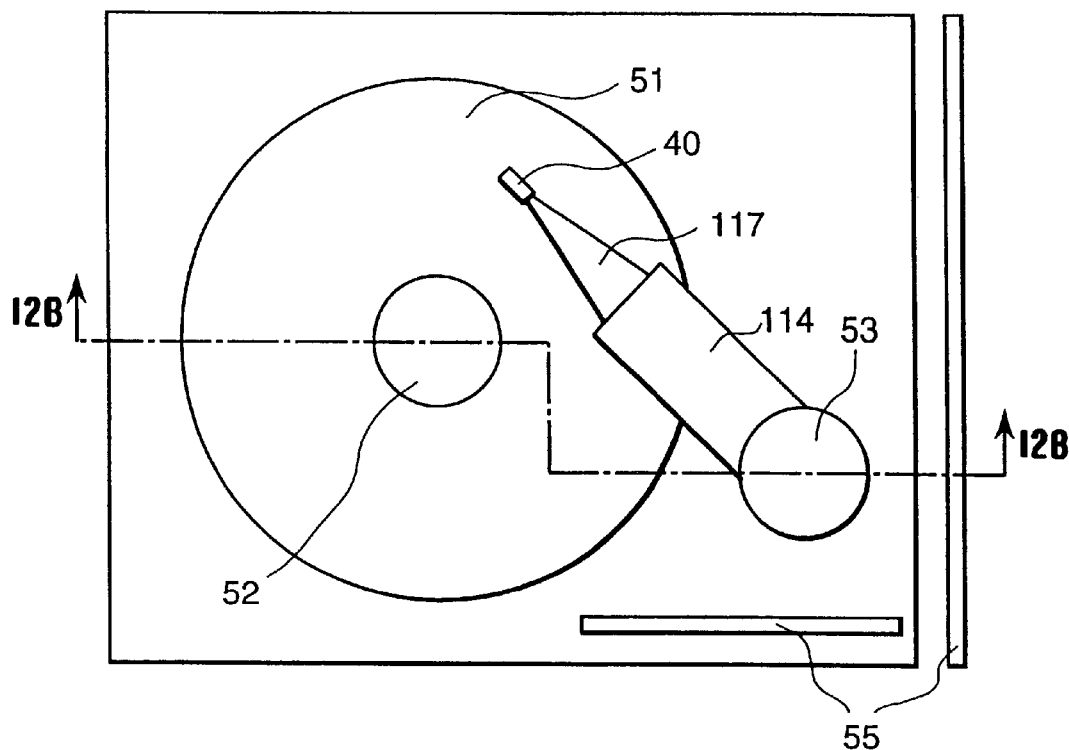
FIG. 12A is a plan view and FIG. 12B is a cross-sectional view of a magnetic recording and reproducing apparatus.
Figure 12B:
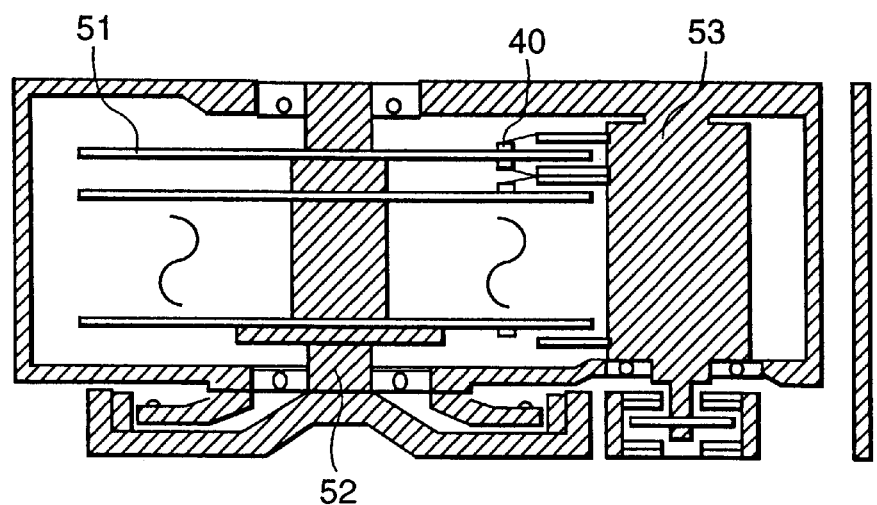

FIGS. 12A and 12B show an example of a magnetic disk apparatus using the recording/reproduction separation type magnetic head of the invention. Recording/reproduction separation type magnetic head 40 is provided on a slider made from sintered material of $Al_2O_{31}$ floated above a thin film magnetic disk 51 serving as a recording medium which is rotated by a spindle 52, and positioned by head positioning mechanism 53 with high accuracy. A reproduction signal and a recording signal read by the recording/reproduction separation type magnetic head 40 are processed by a recording/reproduction signal processor 55.

Figure 13:
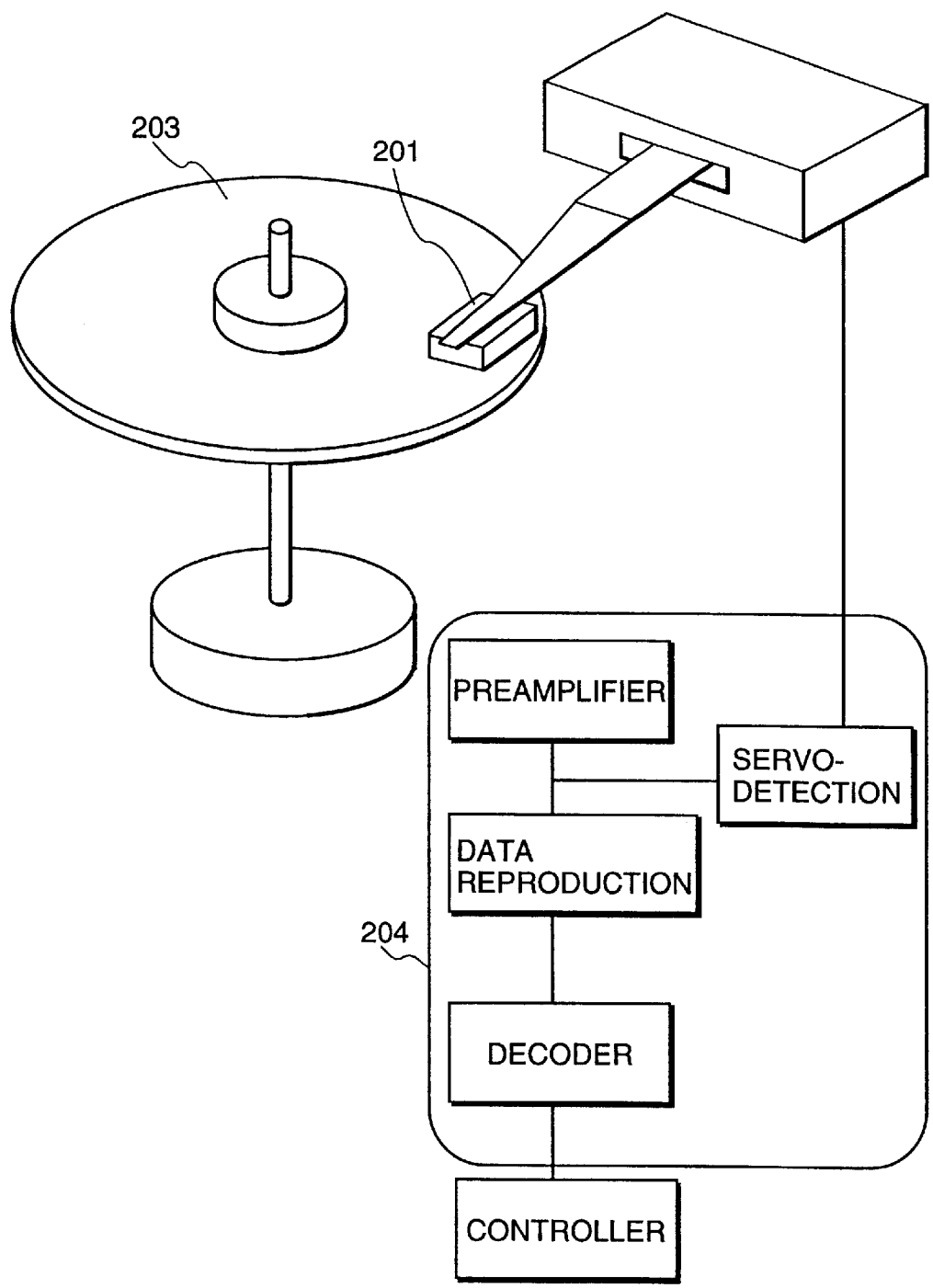
FIG. 13 is a diagram showing the principle of operation of a magnetic recording and reproducing apparatus.

FIG. 13 is a diagram showing the operational principle of a magnetic disk apparatus using the recording/reproduction separation type magnetic head as shown in FIG. 12A. Head positioning mechanism 202 positions recording/reproduction separation type magnetic head 201 above a magnetic disk serving as recording medium 203, which is rotated by a motor. The recording/reproduction separation type magnetic head 201 is connected to reproduction signal processing system 204.

The apparatus includes a DC motor for rotating the magnetic disk, the magnetic head for writing and reading information, a positioning device, that is, an actuator and a voice coil motor, for positioning the means which supports the magnetic head and changes the position thereof with respect to the magnetic disk, an air filter for keeping the inside of the apparatus clean, and the like. The actuator has a carriage, a rail and a bearing. The voice coil motor includes a voice coil and a magnet. In FIG. 12B, there is shown a case where eight magnetic disks are attached to the same rotary shaft to increase the total storage capacity.

As the magnetic disk, there is used a medium having a preferable surface condition in which the surface roughness $R_{MAX}$ is 100 Å or smaller, preferably 50 Å or smaller. On the magnetic disk, a magnetic recording layer is formed on the surface of the rigid substrate by a vacuum film formation method. As the magnetic recording layer, a magnetic thin film is used. Since the thickness of the magnetic recording layer formed by the vacuum film formation method is 0.5 µm or less, the surface condition of the rigid substrate is reflected as a surface condition of the recording layer. Consequently, the rigid substrate having a surface roughness $R_{MAX}$ of 100 Å or smaller is used. As such a rigid substrate, rigid substrate material containing glass, chemically strengthened soda aluminosilicate glass or ceramics as a main component is suitable.

When the magnetic layer is made of a metal or an alloy, preferably, an oxide layer or a nitride layer is deposited on the surface or the surface is oxidized. It is also desirable to use a carbon protective layer or the like. With these, the durability of the magnetic recording layer is improved. Even when recording and reproducing operations are executed with an extremely small floating amount and even at the time of contact, start and stop, the magnetic disk is prevented from being damaged.

When the performance (overwrite characteristic) of the recording head according to the invention was measured, an excellent recording performance of about −50 dB was obtained even in a high frequency area of 40 MHz or higher.

According to the embodiment, a high-sensitive MR sensor can be obtained, in which the recording can be sufficiently performed also for a medium having a high coercive force even in a high frequency area, and which has a media transfer speed of 15 MB/seconds or higher, a recording frequency of 45 MHz or higher, a high-speed transfer of data of 4000 rpm or higher of the magnetic disk, a reduction in the access time, an increase in the recording capacity and excellent MR effects based on an anisotropic magnetic resistive effect. Thus, a magnetic disk apparatus having a surface recording density of 3 $Gb/in^2$ or higher can be obtained.

Embodiment 2

Figure 14:
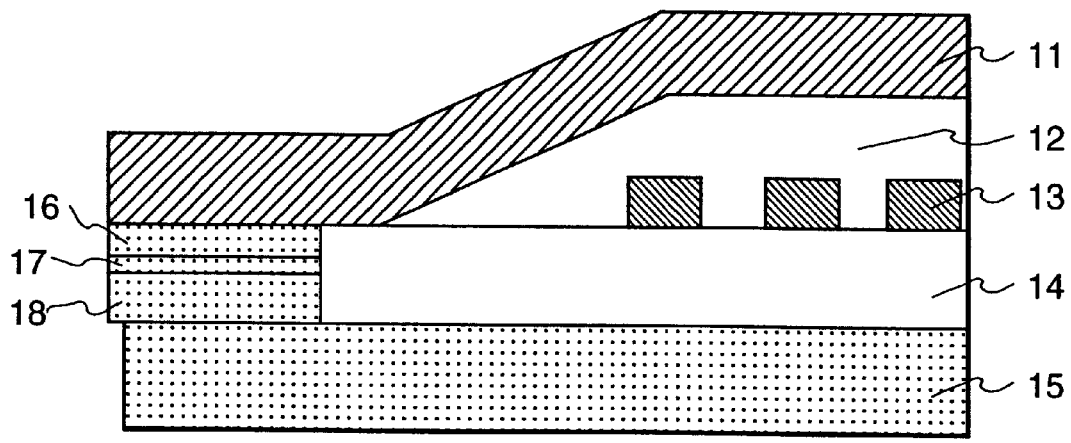
FIG. 14 is a cross section of a magnetic recording head.

FIG. 14 shows a cross section of a thin film magnetic head for recording, which has an upper magnetic film 11 and a lower magnetic film 15 spaced via a non-magnetic gap film 17 in place of the arrangement of FIG. 3. The lower end part magnetic film 18 is, via the magnetic gap, formed on the magnetic gap side of the lower magnetic film 15 in the end part where the magnetic gap is formed.

The area of the cross section, which is in parallel to the air bearing surface, of the lower end part magnetic layer is smaller than that of the lower magnetic film in the part having the magnetic gap.

The width of the lower end part magnetic film is narrower than that of the lower magnetic film. The lower end part magnetic film is projected from the lower magnetic film toward the air bearing surface side.

The lower end part magnetic film in this embodiment is constructed by a plated magnetic film having a saturable magnetic flux density of 1.5 tesla or more. The lower end magnetic film is formed by plating or sputtering so as to have a width wider than the frame width of the plated magnetic film and a specific resistance of 50 $\mu\Omega\cdot cm$ or higher.

The upper end part magnetic film 16 and the lower end part magnetic film 18 have the same track width. The upper shield film for magnetically shielding the upper magnetic film and the magnetic resistive film is wider than the track width, and the upper magnetic film can be formed as a multilayered magnetic film.

Embodiment 3

Figure 15:
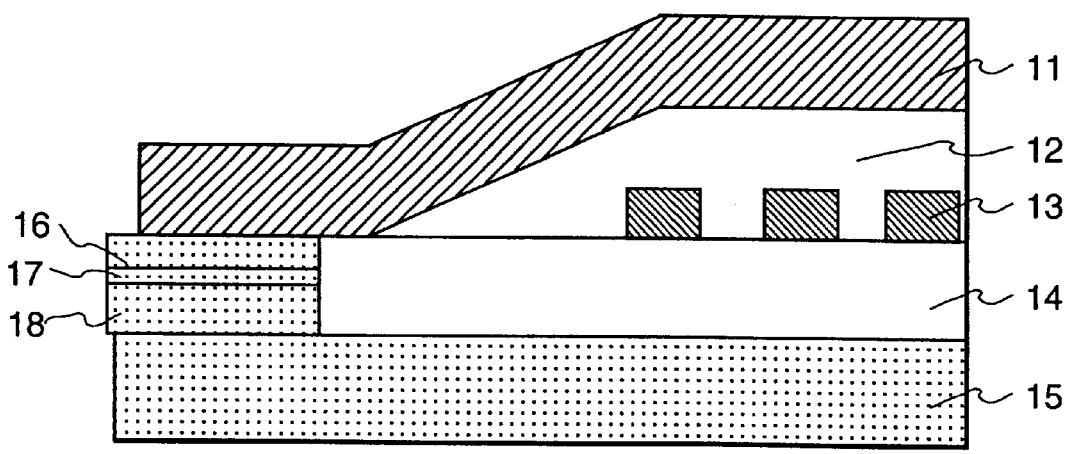
FIG. 15 is a cross section of a magnetic recording head.

Similarly to the above, FIG. 15 shows a cross section of a thin film magnetic head, which has an upper magnetic film 11 and a lower magnetic film 15 spaced via the non-magnetic gap film 17 in place of the arrangement of FIG. 3. The upper end part magnetic film and the lower end part magnetic film are, via the magnetic gap, formed on the magnetic gap side of the upper magnetic film 11 and the lower magnetic film 15 in the end part where the magnetic gap is formed, respectively.

The areas of the cross sections parallel to the air bearing surface of the upper and lower end part magnetic films are smaller than those of the cross sections in the parts where the magnetic gap is formed of the upper and lower magnetic films.

Further, the track width of each of the upper and lower end part magnetic films is narrower than that of each of the upper and lower magnetic films.

The upper and lower end part magnetic films on the air bearing surface are projected toward the air bearing surface from the upper and lower magnetic films. Although the lower magnetic film 15 is slightly projected from the top of the upper magnetic film 11 in this embodiment, they can also have the same length.

Each of the upper and lower end part magnetic films is a plated magnetic film having a saturable magnetic flux density of 1.5 tesla or higher formed by plating or sputtering so as to have a width wider than the frame width of the plated magnetic film and a specific resistance of 50 $\mu\Omega$·cm or more.

Further, the upper and lower end part magnetic films have the same track width. The upper shield film for magnetically shielding the upper magnetic film and the magnetic resistive film has a width wider than the track width and the upper magnetic film is constructed by a multilayered magnetic film.

Embodiment 4

Figure 16A:
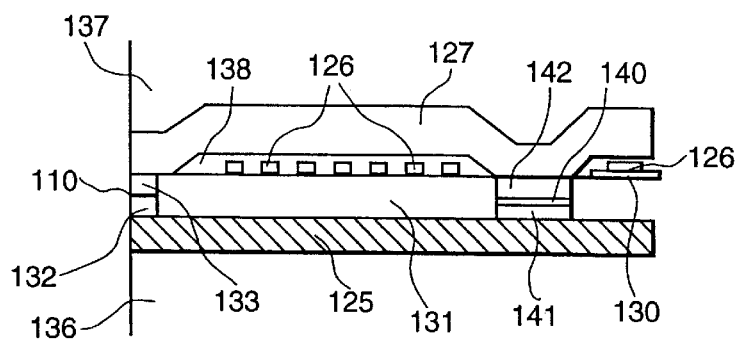
FIGS. 16A, 16B and 16C are conceptual diagrams showing a magnetic head of the invention.
Figure 16B:
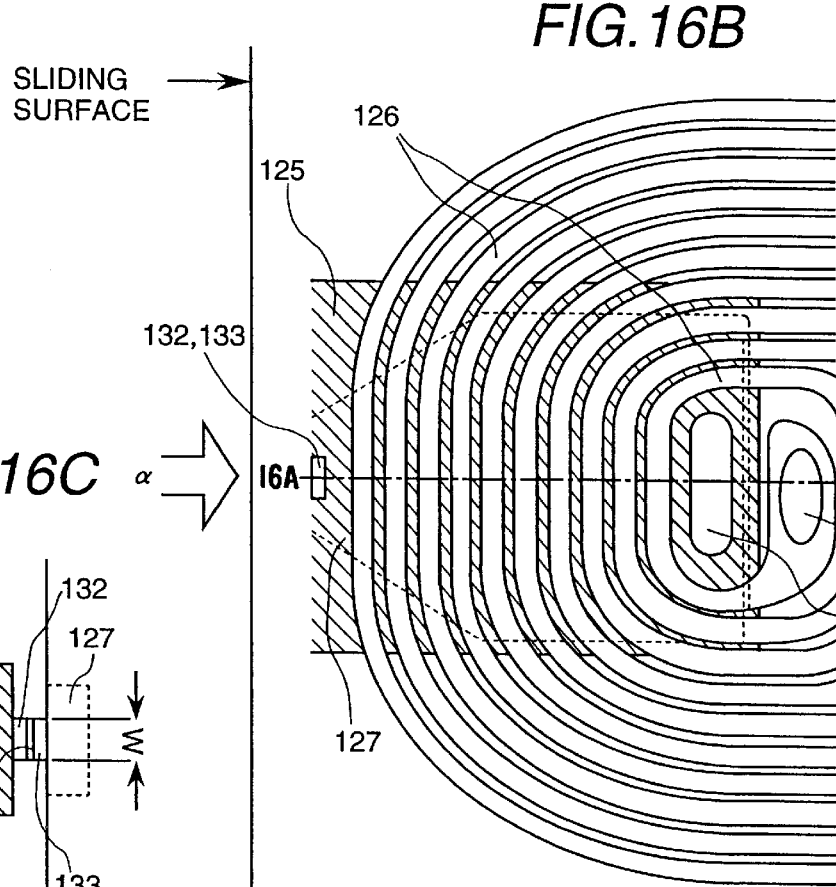
Figure 16C:
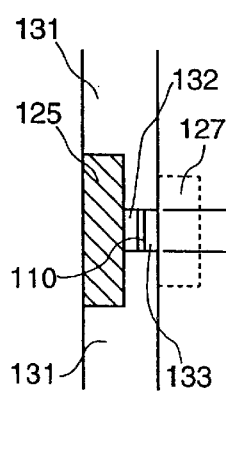

FIGS. 16A to 16C show an embodiment of a magnetic head to which the invention is applied. In the figures, FIG. 16A shows a cross section of the construction, FIG. 16B shows a plan view and FIG. 16C shows a plan view of the air bearing surface.

The first magnetic film described in accordance with the invention corresponds to lower core 125 as shown. The fourth magnetic film corresponds to upper core 127. Coil 126 exists between the first and fourth magnetic films. The coil 126 is made of conductive material having a thickness of 2 $\mu$m and whose main component is Cu, Au, Al, Ta, Mo and the like. Insulating material 138 is filled in order to maintain electric insulation between the coil 126 and the core 127.

Second magnetic film 132 and third magnetic film 133 are inserted between the upper core 127 serving as the fourth magnetic film and the lower core 125 serving as the first magnetic film. A magnetic gap (or recording gap) 110 is formed by those members. The construction mentioned above is the same as that of a magnetic head according to the conventional technique.

In accordance with the invention, a notch structure described in the conventional technique does not exist. Instead, non-magnetic film 131 having a single structure which is in contact with second magnetic film pattern 132 and third magnetic film pattern 133 is provided. The non-magnetic film 131 covers at least almost the whole of the first magnetic film.

The coil 126 is embedded in the insulating material 138 deposited on the non-magnetic insulating film 131.

Magnetic path members 141 and 142 and magnetic gap 140 are provided between the upper core 127 and the lower core 125. This construction is preferable, when a hard film, such as an alumina film, is used as the insulative and non-magnetic film 131 and has the advantage of providing a reduction in the manufacturing costs.

Namely, the alumina film is formed by the sputtering or the like. When, however, the alumina film is formed, it is also deposited on the third magnetic film. In order to achieve the fundamental functions of the magnetic head, it is needless to say that the alumina film has to be selectively removed from the third magnetic film. However, there is a problem in that the alumina film is hard. By employing the construction of the invention, this process will be performed by a method at low cost, which will be described hereinafter.

By forming the members (140, 141, and 142) simultaneously with the second magnetic film 132 and the third magnetic film 133, an increase in the manufacturing costs can be prevented.

Reference numeral 137 in the drawing denotes a member (protective film) for protecting the magnetic head functional part, 138 denotes an electric insulating layer, 130 denotes an electrode for flowing a write current through the coil, and 136 denotes a magnetic head body (slider).

FIG. 16B shows the magnetic head as seen from the side of the upper core corresponding to the fourth magnetic film. From the drawing, it is seen that the coil 126 is wound like a spiral. The coil 126 is connected to the electrode 130 (in FIG. 16A) via contact hole 134. In this case, the coil conductor 126 is arranged outside of the regions in which the second magnetic film 132 and the third magnetic film 133 exist, in order to improve the high frequency characteristic. The upper core 127 and the lower core 125 are coupled in magnetic contact hole 135. The magnetic contact hole 135 has the above mentioned construction including the magnetic path materials 141 and 142 as described above.

The second magnetic film 132 and the third magnetic film 133, representing the features of this magnetic head, are positioned at the ends of the fourth magnetic film 127 and the first magnetic film 125 (ends close to a recording medium), and a part thereof is exposed to the sliding face (strictly, it is often via a sliding face protective layer). FIG. 16C shows the construction of the members, when viewed from the $\alpha$ direction. That is, the second magnetic film 132 and the third magnetic film 133, which are narrow, are sandwiched by the fourth magnetic film 127 and the first magnetic film 125.

The second magnetic film 132 is magnetically coupled to the first magnetic film 125, and the third magnetic film 133 is magnetically coupled to the fourth magnetic film 127 (magnetically coupling means a state where the magnetic path resistance is small). A magnetic gap is formed between the second magnetic film 132 and the third magnetic film 133. Although the magnetic gap length is 0.3 $\mu$m in this embodiment, it is obviously understood that the invention can be also applied to other conditions. As the magnetic gap, a non-magnetic film, such as a Cu film, an alumina film, a silicon oxide film or the like, can be used.

As shown in the drawing, the insulative non-magnetic film 131, representing a single construction film, is exposed to the sliding surface. By using an alumina film or a film containing a small amount of diamond as the insulative non-magnetic film 131, the mechanical strength can be enhanced. Thus, a very reliable magnetic head can be realized.

In order to realize high density recording, the width of the third magnetic film exposed to the sliding surface is set at 1.0 $\mu$m or narrower, and in addition, the thickness of the third magnetic film pattern is set at 1.0 µm or less in order to satisfy the frequency characteristic and the write magnetic field strength requirements.

An effect is obtained by using electrolyte plating for forming the third magnetic film. Further, by constructing the magnetic pole under conditions which will be described hereinafter, the magnetic head which can be also driven at a high frequency can be realized.

In accordance with the invention, the electric resistance of both of the first and fourth magnetic films is selected to be rather high (specific resistance: 50 µΩ·cm or higher, the reason will be mentioned hereinafter). Specifically, the film is formed by a Co.Ta.Zr amorphous alloy film, a Sendust, a Co.Zr.Nb.Ta amorphous alloy film, a multilayered film and the like.

The film formation is performed by sputtering. The film pattern is processed by a dry method such as a lift-off method and a dry etching method. With respect to films each having a high specific resistance, it is difficult to form a pattern by electrolyte plating to have an excellent fine processing ability. Consequently, it was considered conventionally that application to a magnetic pole material having a narrowed magnetic pole width is difficult.

According to this construction, since such material is used only for the part where the pattern area (pattern width) is wide, the pattern can be formed by the dry method. Since the magnetic film patterns have a large area, the magnetic field necessary for the writing operation can be led to the top of the magnetic pole (sliding surface side), without forcibly using material having a large saturable magnetic flux density.

In contrast to the second magnetic film, the third magnetic film positioned on the outflow end side (trailing side) is made of a material having a saturable magnetic flux density of 1.5 T or more. This is because the magnetic field from the outflow end side exerts an influence on the quality of magnetic domain information to be recorded into the medium (overwrite characteristic, magnetization inversion length and the like). Simply stated, a function of generating a sufficient recording magnetic field is important. It is well known that a sufficient recording magnetic field is generated from a material having a high saturable magnetic flux density.

Specifically, the third magnetic film is made of an alloy of Co.Ni.Fe, Ni.Fe, a pure iron, a nitride iron or the like. The electric resistance of each of those films is almost 50 µΩ·cm or lower, and films having an electric resistance lower than that of each of the first and fourth magnetic films are selected, so that the film can be formed by electrolyte plating in order to realize a high density recording.

A high-resistive film has the property that electricity is not easily passed therethrough. Consequently, segregation easily occurs at the time of electrolytic plating and a film of a good quality cannot be grown. Further, a film including an insulative substance cannot be grown by plating. For those reasons, a material having a low electric resistance and a high saturable magnetic flux density, which includes no insulative substance, is selected for the third magnetic film.

Figure 19:
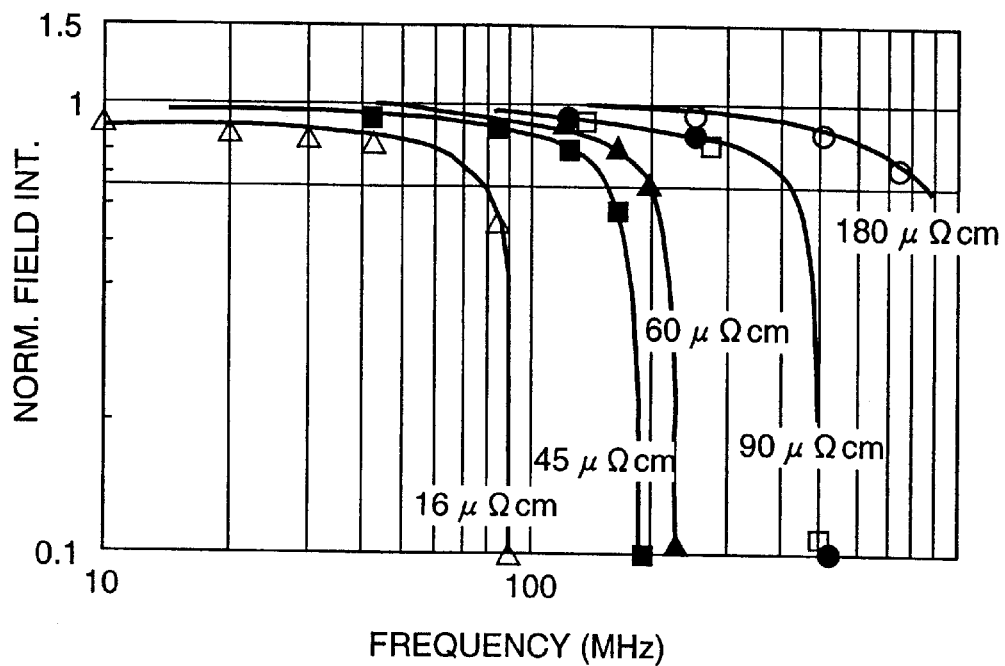
FIG. 19 is a frequency characteristic diagram, showing what occurs when the specific resistance of the first and fourth magnetic film patterns is changed.

Next, the reason why the specific resistance value of the first and fourth magnetic films is set at 50 µΩ·cm or higher will be described. FIG. 19 shows the result of measurement of the frequency characteristics of a magnetic head, while changing the specific resistance of the first and fourth magnetic films. An electron beam tomography method was used for the measurement. The relative magnetic permeability µ of the magnetic film was fixed to almost 1000. The film thickness of each of the magnetic films was fixed to 2.8 µm. The overlapped part (Dg shown in FIG. 21) of the fourth and third magnetic films was set to 2 µm.

It is understood from the graph that, in case of using material having a specific resistance of 16 µΩ·cm (a general value of Ni.Fe material), the magnetic field which is generated (leaked) is reduced to 50% or lower at a driving frequency of 90 MHz as compared with the result at the driving frequency of 10 MHz (almost equal to the result in case of a magnetostatic state). It is also understood that, in case of material having a specific resistance of 60 µΩ·cm or higher, reduction in the generated magnetic field is small and a strong magnetic field almost to 200 MHz occurs.

In the magnetic disk apparatus, high-speed writing is demanded. In order to satisfy this demand, a magnetic head for generating a write magnetic field at a high frequency is necessary. For this reason, a material having a high specific resistance is used for the first and fourth magnetic films.

Figure 20:
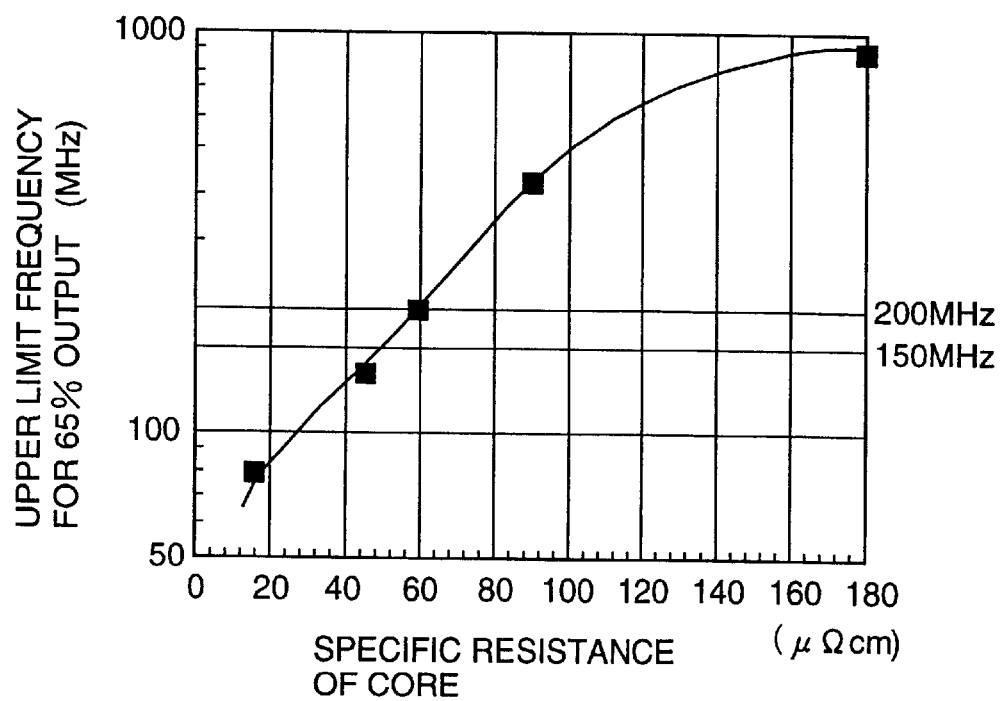
FIG. 20 is a graph showing the relation between the specific resistance of a core and the upper limit of the driving frequency.

FIG. 20 is a graph which is used to estimate the specific resistance of a core (corresponding to each of the first and fourth magnetic films as described in accordance with the invention) which is necessary for high frequency driving. The ordinate in the graph shows the upper limit frequency (which can be obtained from FIG. 19) by which 65% of a magnetic field at the time of a low frequency driving of about 1 MHz can be obtained. The magnetic field of 65% is a value which is the lower limit value of a magnetic field necessary for a regular writing operation and is obtained from experience gained in the manufacturing of the apparatus.

It is understood from the chart that driving at 150 MHz is enabled by increasing the specific resistance of the core to 50 µΩ·cm.

The specific resistance value is satisfied under the conditions of use of the head provided for this study and can be developed to a general value by the following.

The frequency characteristic of a magnetic head depends on a value $fg(\rho, \mu, t)$, even if the conditions of the magnetic pole are changed, where $\rho$ denotes the specific resistance value of magnetic pole material, $\mu$ denotes the relative magnetic permeability of the material and t denotes the thickness of a magnetic pole film. They have the following relation.

$$fg = \rho/(\mu \times t2) \tag{1}$$

When the head conditions (magnetic pole conditions), which exist for 150 MHz driving, are substituted in the equation, the following is obtained.

$$fg' = 50/(1000 \times 2.82) \approx 0.0064 \tag{2}$$

Consequently, the head conditions which exist for 150 MHz driving, even if the condition of the magnetic film is changed, has to satisfy the following.

$$\rho/(\mu \times t2) > 0.0064 \tag{3}$$

From the equation, it is understood that a material of $\rho < 50$ µΩ·cm can be applied when a magnetic pole of t2 is used.

This is satisfied under the condition that the thickness of the upper core and that of the lower core are equal to each other. When the thickness is different therebetween, however, it was confirmed that the equation is satisfied by using the thickness of the thicker core. Therefore, the equation can be applied to all magnetic heads having the construction of the invention.

A high frequency driving condition exceeding 150 MHz can be also obtained from the result shown in FIG. 20. That is, the value of ρ, at which a 65% or larger magnetic field with respect to the magnetostatic field can be generated, is read and the value is substituted for the equation (2), thereby obtaining fg'. From the value fg', a magnetic film condition (ρ, μ, t) satisfying the expression (3) can be obtained.

The state of driving at 150 MHz is realized by using material having a specific resistance value of 50 μΩ·cm or higher, as long as the film thickness is not reduced. Although material having a specific resistance value of 50 μΩ·cm or higher has been developed, a magnetic disk apparatus using such material had not been developed, since the high frequency driving is developed together with an increase in the density of the apparatus.

That is, even if the density in the sliding direction (circumferential direction) becomes higher by improvement of the driving frequency, the data becomes serial and the access time increases (a reel memory state), so that the random access performance as a feature of the magnetic disk deteriorates. In order to increase the density, consequently, it is necessary to increase the density not only in the sliding direction, but also in the track width direction by narrowing the magnetic pole width.

A film having a high specific resistance, which can be formed by electrolytic plating, has a high magnetostriction constant, as well as a drawback in that a crack easily occurs in a mask member, when a fine pattern is formed. A multilayer film, in which an amorphous or oxide film or the like having an even higher specific resistance is sandwiched, has a drawback in that a pattern cannot be formed by electrolytic plating. There is accordingly a drawback in that a narrow magnetic pole width cannot be realized. Consequently, a high frequency and a high density cannot be obtained at the same time. Thus, a magnetic head, which is made of a material having a high electric resistance and which is driven at 150 MHz, and a magnetic disk apparatus using such magnetic head, could not have been realized.

In a fundamental magnetic head construction according to the invention, by applying conditions satisfying the aforesaid formula (3) to the material and construction of the first and fourth magnetic films, a magnetic head driven at a frequency of 150 MHz or higher and a magnetic disk apparatus using the same magnetic head can be realized for the first time. Such knowledge had never been disclosed conventionally and is made clear for the first time from the results as shown in FIGS. 19 and 20.

The result as shown in FIG. 19 is not influenced by the value of the specific resistance of the third magnetic film. It is a phenomenon limited to a case where the volume of the third magnetic film described in the embodiment is smaller than that of the first and fourth magnetic films.

Figure 23:
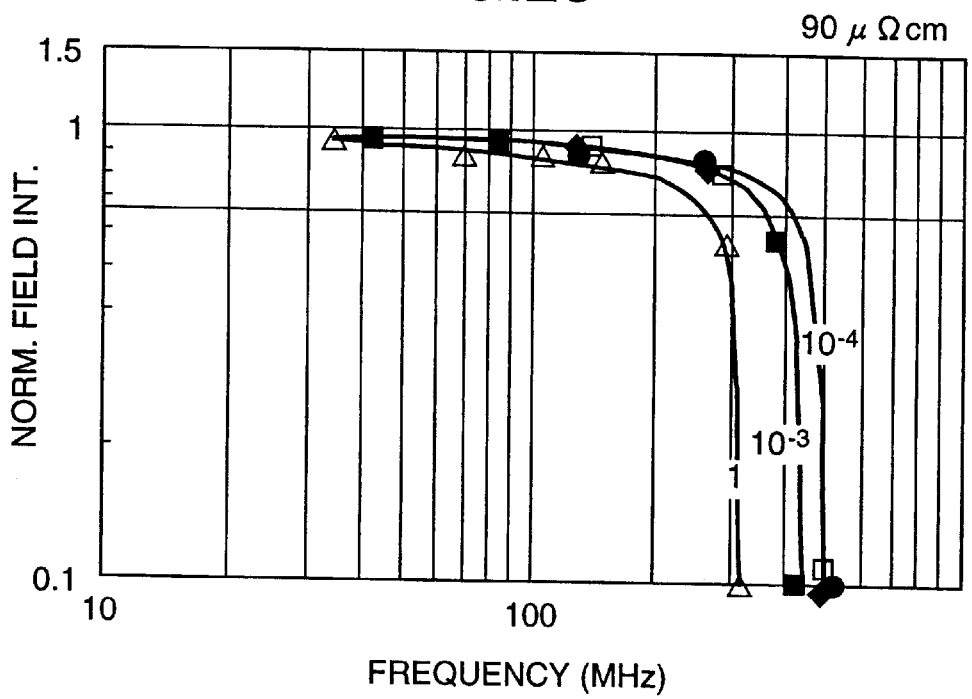
FIG. 23 is a graph showing the relation between the volume of the third magnetic film and the frequency characteristic.
Figure 24:
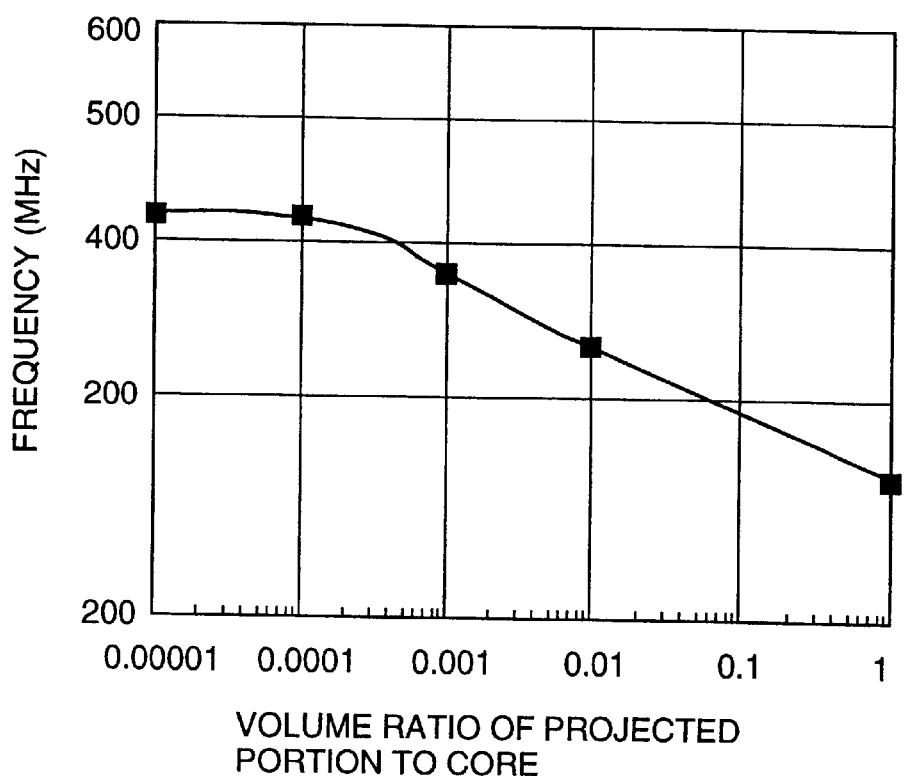
FIG. 24 is a graph showing the relation between the volume of the third magnetic film and the upper limit of a writable frequency.

FIG. 23 shows the frequency characteristic, as in FIG. 19, in which the ratio of the volume of the third magnetic film and that of the first and fourth magnetic film patterns is used as a parameter. It is understood from this diagram that the more the volume ratio approaches the more the frequency characteristic deteriorates (volume ratio 1 simply means a state where patterns having the same thickness are overlapped). The results are summarized as shown in FIG. 24 (it is shown in the same manner as in FIG. 20). It is understood from FIG. 24 that the more the volume ratio is reduced, the more the upper limit of the frequency, at which the generated magnetic field becomes 65% or more of the magnetostatic field, is improved. However, the upper limit tends to be saturated. It is also understood that the existence of the third magnetic film can be almost ignored, if the volume of the third magnetic film is set at $10^{-4}$ or smaller of the volume of the first and fourth magnetic films. The volume of the third magnetic film is consequently specified within this range in accordance with the invention.

Figure 22:
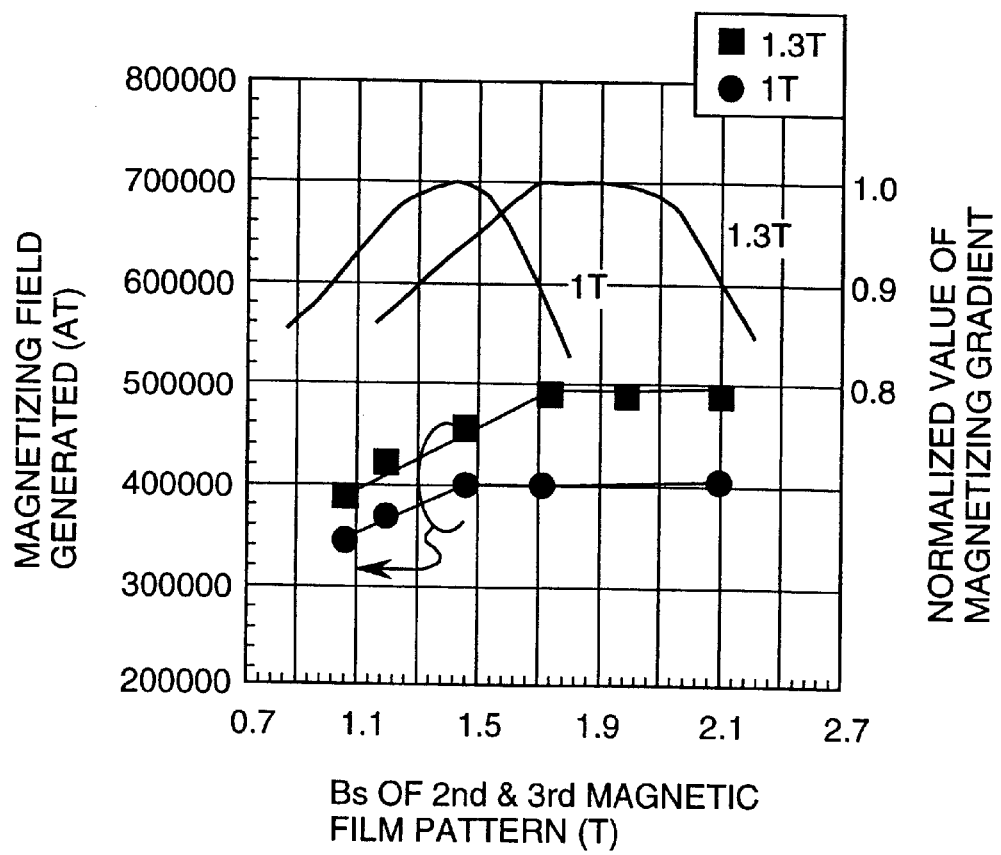
FIG. 22 is a graph showing the relation among the magnetic pole condition, the magnetic field intensity, and the magnetic field gradient.

As the third magnetic film, since a strong magnetic field for writing has to be generated, other material conditions are required. FIG. 22 shows the relation between the saturable magnetic flux density Bs of the third magnetic film (it is assumed here that Bs of the second magnetic film is set to be the same) and the intensity of the generated magnetic field. The result of changing the Bs of the first and fourth magnetic films as a parameter is shown. It is understood from the result that the more the Bs of the third magnetic film is increased, the more intensive the generated magnetic field becomes. It is known that generally speaking, a medium having high coercive force is suitable for high density recording. It is also known that the higher the coercive force of the medium is, the more intensive will be the magnetic field necessary for writing. From the above, the necessity of selecting material having a high Bs for the third magnetic film can be understood.

Even when the Bs of the third magnetic film was thoughtlessly increased, a writing of high resolution was not realized. It was found that this was because of a magnetizing gradient deterioration. FIG. 22 also shows the result of the magnetizing gradients obtained. It is understood from the graph that when the magnetic field gradient is high (0.9 or higher in the normalized value), the range of Bs, in which recording could be performed with a high resolution, was as follows (experimental result: the range, in which the overwrite characteristic of 30 dB was obtained): when the value of Bs of the first and fourth magnetic films is 1 T, that of the third magnetic film lies in the range from 1 T to 1.7 T; and when the value of Bs of the first and fourth magnetic films is 1.3 T, that of the third magnetic film lies in the range from 1.2 T to 2.3 T.

Figure 21:
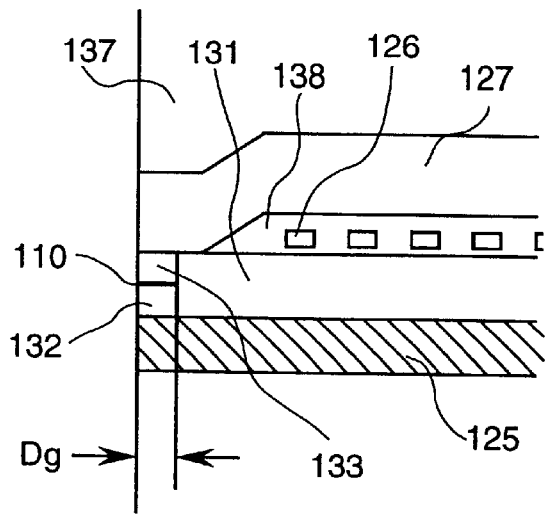
FIG. 21 is a cross section of the construction of a magnetic head of the invention.

When the magnetic path of a magnetic head is considered, the aforesaid range can be described in a general relational expression. In the cross section of the magnetic head as shown in FIG. 21, the magnetic flux flows from the first magnetic film 25 to the second magnetic film 32, and from the third magnetic film 33 to the fourth magnetic film 27. The amount per unit length in the track width direction of the magnetic flux flowing in each magnetic path can be approximately obtained from the product of the thickness t of the magnetic path (magnetic pole thickness) and as. When Bs and t of the first and fourth magnetic films are equal to each other, respectively, a magnetic flux proportional to Bs1×t flows in both films. It is understood that the whole of this magnetic flux flows in the second and third magnetic films, when the product of the length Dg shown in FIG. 21 and Bs2 is equal (Dg is the length of the overlap of the first and second magnetic films or the length of the overlap of the fourth and third magnetic films).

Since the third magnetic film is positioned on the outflow end side with respect to the second magnetic film, the magnetic field from the third magnetic film exerts the most influence on the recording state. The conditions of the third magnetic film will be consequently described hereinbelow.

In the embodiment, since it is fixed as Dg=2 μm and t=2.8 μm, when Bs1 of the first and fourth magnetic films is set at 1 T, the relation is satisfied by setting Bs2 of the third magnetic film at about 1.4 T. As this condition is far from the one stated above, the magnetic flux in the third magnetic film becomes insufficient, or excessive (saturation of the magnetic pole). Therefore, the magnetic field distribution deteriorates.

The range for obtaining a preferable magnetic field distribution can be consequently described by using the values of Bs1, t, Dg and Bs2. When Bx1×t and Dg×Bs2 are calculated with respect to the range, in which the preferable magnetic field distribution can be obtained, the results are as follows:

in case of Bs1×t=2.8,

Dg×Bs2=2 to 3.4, and in case of Bs1×t=3.64,

Dg×Bs2=2.4 to 4.6

When the range is described by using Bs1×t/Dg×Bs2, the range, in which a preferable magnetic field gradient can be obtained, is as follows:

$$0.8 < Bs1 \times t / Dg \times Bs2 < 1.5 \qquad (4)$$

Recording with a high resolution can be realized by using the magnetic head construction of the invention and by satisfying the above mentioned condition.

The specific resistance of the first and fourth magnetic films is generally higher than that of the third magnetic film. Further, the volume of the first magnetic film becomes larger than that of the third magnetic film. Moreover, it is preferable that the construction of a magnetic pole satisfies the formula (4).

Figure 18A:
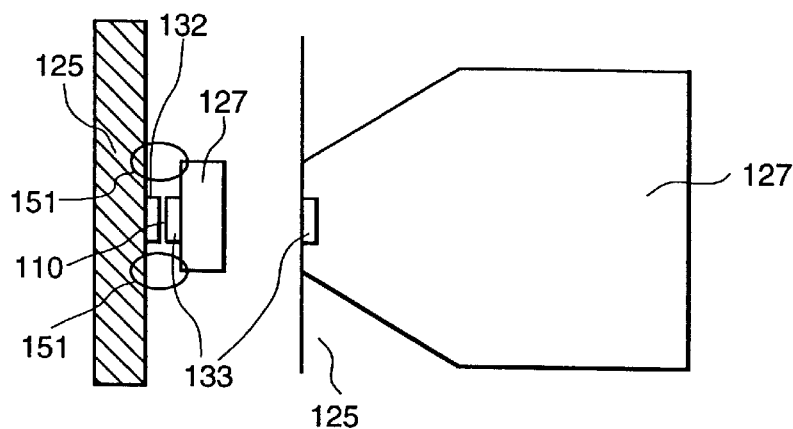
FIGS. 18A to 18C are diagrams illustrating various shapes of a magnetic film pattern according to the invention.
Figure 18B:
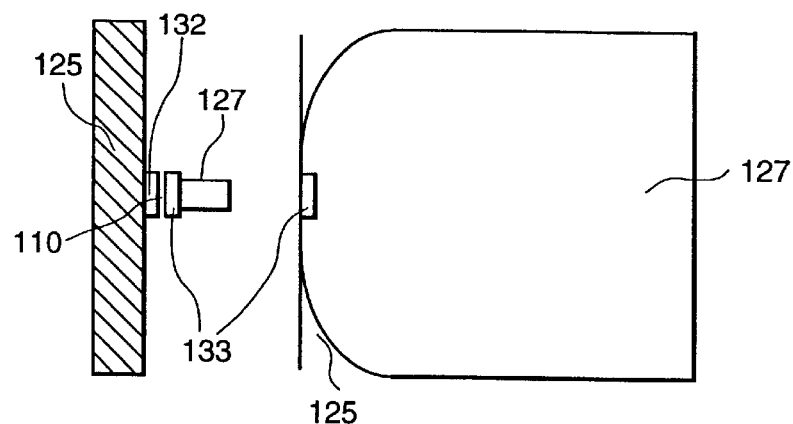
Figure 18C:
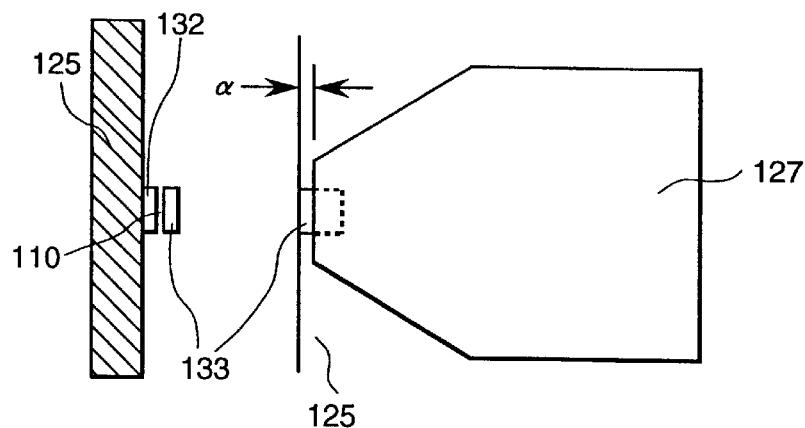

Another feature of the magnetic head of the invention will be described, hereinbelow. FIGS. 18A to 18C schematically show examples of the relation between the fourth magnetic film 127 and other magnetic films 125, 132 and 133. According to the example of FIG. 18A, the shape of the fourth magnetic film 127 is like a house and coincides with the shape of the upper core of the conventional magnetic head. In this shape, it is obvious that the area of the second magnetic film 132 and the third magnetic film 133, exposed to the cross section of the magnetic gap, is narrower than that of the fourth magnetic film 127 which is similarly exposed.

With such a structure, when a general medium is used, a preferable recording operation could be realized. It was understood that the structure is not suitable for a medium having an especially small coercive force. The reason is that the recording operation is executed by the magnetic field from regions 151 shown in the diagram (the writing operation occurs by a very weak magnetic field leaked from the fourth magnetic film 127 to the first magnetic film 125). As obviously understood from the examples of FIG. 18A, since the fourth magnetic film 127 is wide (when it is seen from the cross section close to the medium face), when the writing operation occurs, neighboring information is eliminated.

In accordance with the invention, as shown in FIG. 18B, the shape of the fourth magnetic film 127 is consequently changed. Specifically, by making the ends close to the sliding surface have a curvature, the edges (angles) of the fourth magnetic film are prevented from appearing to the sliding face. A magnetic charge is apt to be concentrated on an edge, so that a leaked magnetic field from an edge inevitably will be strong. By allowing the fourth magnetic film 127 to have a curvature as shown in the drawing, there is no concentration of the magnetic charge, with the result that an erroneous writing operation to the adjacent track, which is a problem in the above technique of FIG. 18A, does not occur. In this case, the area of the fourth magnetic film 127 can be made narrower than that of the second and third magnetic films, as seen from the sliding surface. By spacing the end of the fourth magnetic film 127 from the sliding surface by an amount α, as shown in FIG. 18C, a similar effect could be obtained even in the shape where the magnetic film is not exposed to the sliding surface. It can be understood that the writing operation does not occur because the edge of the fourth magnetic film is spaced from the medium face.

Although only the fourth magnetic film is embodied, it goes without saying that the first magnetic film can be also changed. However, the first magnetic film does not have to be particularly changed. By changing the shape of the fourth magnetic film pattern, the distance between facing magnetic poles (the distance between the magnetic poles in the regions 151 as shown in FIG. 18A can be widened, and so the leaked magnetic field does not exert any influence on the adjacent track from the above mentioned effect. In the following, a method of fabricating a magnetic head (of the invention), in which a non-magnetic film having a single structure is provided between the second and third magnetic films, will be described with reference to FIGS. 17A to 17F. The processes will be sequentially described.

Figure 17A:
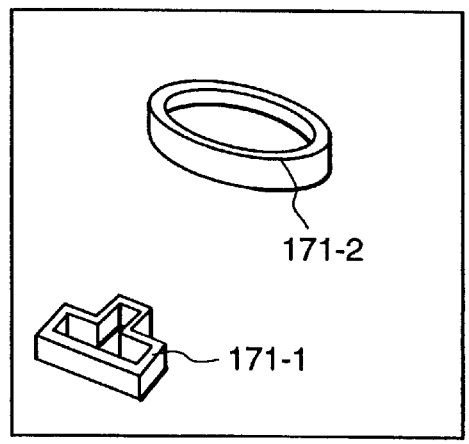
FIGS. 17A to 17F are diagrams showing the process according to a method of fabricating a magnetic head of the invention.

FIG. 17A shows a state in which frame pattern 171-1 for determining the shapes of the second and third magnetic films is formed after the first magnetic layer 125 serving as the lower core is deposited on the substrate. In this case, in order to simultaneously form a back contact pattern, frame 171-2 is formed. The frame patterns 171-1 and 171-2 are made of a high polymer resin such as a resist or silicon oxide or the like. The cross section of the frame pattern is vertical and has to be minute. For these reasons, a thin film resist pattern is first formed and is transferred to a film of inorganic matter, and after that, the thin film pattern is used as a mask and the high polymer resin or the like of an underlayer is etched. For this etching, anisotropic etching using oxygen, fluorine gas, or the like is suitable (a multilayer process used for fabricating a semiconductor device is suitable).

Figure 17B:
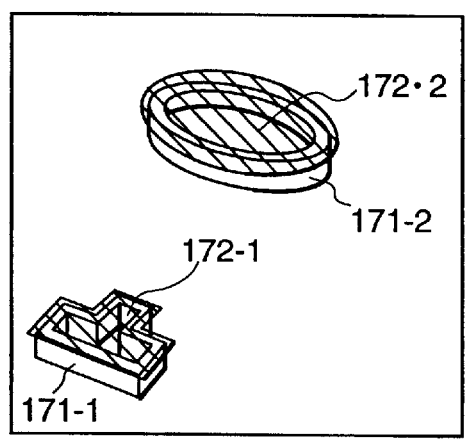

After that, as shown in FIG. 17B, the second magnetic film, the non-magnetic conductive film (specifically, Cu, Ta, or the like) for forming the recording gap, and the third magnetic film are deposited. The films are formed by electrolytic plating (or electroless plating). After that, resist patterns 172-1 and 172-2 are overlayed on regions at least covering the frames 171-1 and 171-2.

Figure 17C:
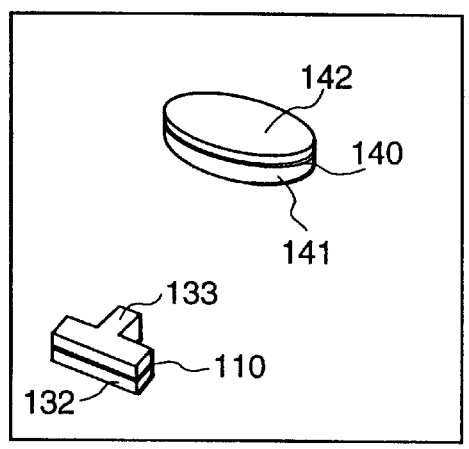

After forming those patterns, the area, which is rot covered by the resist patterns, is removed by a wet method. After that, as shown in FIG. 17C, by removing the frames and resist patterns, the second magnetic film 132, the magnetic gap 110, the third magnetic film 133, the magnetic path materials 141, 142, and the magnetic gap 140 can be formed.

The two-dimensional shape of the second magnetic film and that of the third magnetic film are the same. Since the formation of the pattern can be completed in a single operation, it is efficient.

Figure 17D:
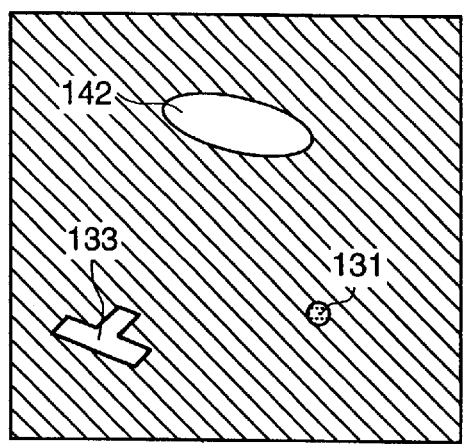

After that, as shown in FIG. 17D, the insulating film 131 in the form of an alumina film or the like is applied so as to cover the whole region of the first magnetic film. The surface of each of the third magnetic film 133 and the magnetic path material 142 (back contact) is then exposed. For this process, a method of mechanically polishing the surface or a planarization process, which is used for fabricating the semiconductor device or the like, is used. The planarization process is performed by thickly applying a resin to smoothen steps, performing dry etching to a desired thickness while keeping the smooth face, and exposing a part of a projection on the smooth face by keeping etching speed of the resin and that of the projection at 1:1. Since the insulating layer can be selectively removed by a single process in any case, the productivity is excellent and the manufacturing costs of the apparatus can be reduced.

Figure 17E:
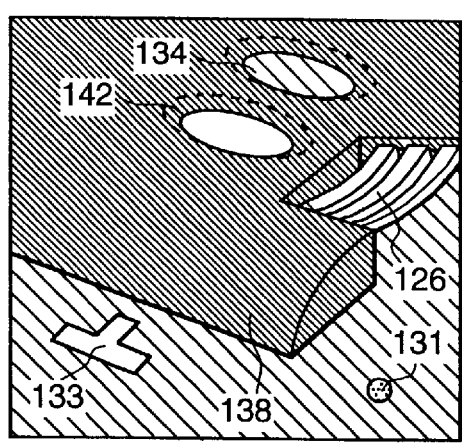
Figure 17F:
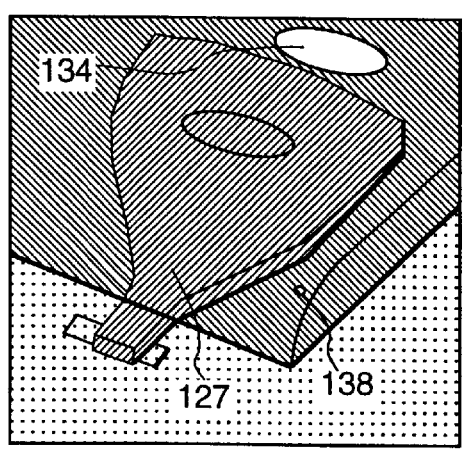

After forming the coil 126 as shown in FIG. 17E, the insulating layer 138 is formed. The insulating layer 138 is tapered toward the third magnetic film. Opening 134 is formed in a back contact part (for exposing the surface of the magnetic path material 142) and a contacting part of the coil 126 and the electrode.

After that, the fourth magnetic film 127 is formed by an ion milling method or a lift-off method. By connecting the electrode to the contact hole 134, the fabrication of a main part (only the writing part) of the magnetic head is finished.

By the above mentioned processes, the magnetic pole structure shown in FIG. 16A and FIG. 16B can be formed. The magnetic head is formed on a wafer obtained by mechanically processing a sintered body of alumina and titanium carbide, thereby fabricating the magnetic head slider.

The structure of FIG. 17C also can be formed by forming the third magnetic film pattern by electrolytic plating and etching by using the pattern as a mask. For the etching, an ion milling method is suitable. In order to form the magnetic gap and the second magnetic film by this method, it is obviously understood that the insulating film (constructing the recording gap) made of alumina or the like and the magnetic film have to be preliminarily deposited under the third magnetic film. This causes no problem, even if the magnetic film is made of the same material as that of the first magnetic film positioned below, as long as the third magnetic film is positioned on the outflow end side with respect to the second magnetic film.

The magnetic head of the invention formed by the above processes is attached to suspension member 117 as shown in FIG. 12A. The rotary actuator 53 is used to position the magnetic head 40 attached to the end of the suspension member 117 at an arbitrary position above the recording medium 51. The existence of the arm 114 used for connecting the rotary actuator 53 and the suspension member 117 is unnecessary in a recording apparatus of 2.5 inches or smaller.

The magnetic recording apparatus having a magnetic head with the above construction is extremely reliable, since the hard alumina film or the like is exposed to the sliding surface side. The track width (magnetic pole width) of the writing part forming the magnetic head is determined by the width of the third magnetic film. Since the pattern can be formed by electrolytic plating, a magnetic recording apparatus corresponding to a narrow track of 1 µm or narrower can be easily manufactured.

By using material having a high specific resistance for the first and fourth magnetic films, a magnetic head driven at the frequency of 150 MHz or higher can be realized. From the above effects, a high-speed and high-density (10 Gb/in$^2$ or higher) magnetic recording apparatus, which is conventionally considered to be impossible to realize, can be realized. This is the result of the optimization of the insulating film structure, the optimization of the magnetic film, and the like. The magnetic recording apparatus (magnetic head) of the invention having such features can be manufactured at low cost without requiring any complicated manufacturing means.

What is claimed is:

1. A method of forming a thin film magnetic head, comprising the steps of:
    forming a first magnetic layer;
    forming a second magnetic layer as a magnetic flux passage in combination with the first magnetic layer; and
    forming a laminate structure body between the first magnetic layer and the second magnetic layer;
    wherein the step of forming the laminate structure body includes forming a third magnetic layer, a fourth magnetic layer and a non-magnetic conductive layer between the third magnetic layer and the fourth magnetic layer, projecting the laminate structure body more toward an air bearing surface than a projection of the first magnetic layer and the second magnetic layer toward the air bearing surface, and providing the laminate structure body with a width which is smaller than a width of the first magnetic layer and the second magnetic layer; and
    wherein the forming of each of the third magnetic layer and the fourth magnetic layer includes utilizing a plated magnetic film having a saturable magnetic flux density of at least 1.5 tesla, and the forming of the second magnetic layer includes utilizing plating or sputtering and providing a width wider than a frame width of the plated magnetic film and a specific resistance of at least 50 µΩ·cm under a condition that the thin film magnetic head performs a predetermined high density recording at a predetermined high driving frequency.

2. The method according to claim 1, wherein the third magnetic layer and the fourth magnetic layer are formed to have the same track width, each of the first magnetic layer and the second magnetic layer is formed to have a width wider than said track width of the third and fourth magnetic layers, and the second magnetic layer is formed as a multilayered magnetic film.

3. The method according to claim 2, wherein the thin film magnetic head is a recording head further comprising the step of forming a recording/reproduction separation type magnetic head in which the recording head is utilized for writing information and a reproduction head is integrally formed therewith which is utilized for reading information.

4. The method according to claim 3, wherein the reproduction head is formed so as to include a ferromagnetic layer having magnetic resistive effect and an antiferromagnetic layer for allowing the ferromagnetic layer to show one-way anisotropy, and the antiferromagnetic layer is made of an Cr—Mn alloy.

5. The method according to claim 1, wherein when a saturable magnetic flux density of the second magnetic layer is denoted by Bs1 (Y), a film thickness by t(µm), a saturable magnetic flux density of the fourth magnetic layer by Bs2 (T) and an overlapped length in a floating direction of the second and fourth magnetic layers by Dg (µm), the following relation is satisfied:

$$0.8 < Bs1t \times /Bs2 \times Dg < 1.5.$$

6. The method according to claim 5, wherein the third magnetic layer is made of the same material as that of said first magnetic layer.

7. A method of forming thin film magnetic head, comprising the steps of:
    forming a first magnetic layer;
    forming a second magnetic layer; and
    forming a laminate structure body between the first magnetic layer and the second magnetic layer with a narrower width than a width of the first magnetic layer and the second magnetic layer;
    wherein the step of forming the laminate structure body includes forming a third magnetic layer, a fourth magnetic layer and a non-magnetic conductive layer between the third magnetic layer and the fourth magnetic layer, magnetically coupling the first magnetic layer and second magnetic layer at one end thereof with the laminate structure body which is projected more toward an air bearing surface than a projection of the first magnetic layer and the second magnetic layer toward the air bearing surface, and magnetically coupling the first magnetic layer and the second magnetic layer to each other at an other end thereof; and wherein the forming of each of the third magnetic layer and the fourth magnetic layer includes utilizing a plated magnetic film having a saturable magnetic flux density of at least 1.5 tesla, and the forming of the second magnetic layer includes utilizing plating or sputtering and providing a width wider than a frame width of the plated magnetic film and a specific resistance of at least 50 $\mu\Omega$·cm under a condition that the thin film magnetic head performs a predetermined high density recording at a predetermined high driving frequency.

8. The method according to claim 7, wherein the third magnetic layer and the fourth magnetic layer are formed to have the same track width, each of the first magnetic layer and the second magnetic layer is formed to have a width wider than the track width of the third and fourth magnetic layers, and the second magnetic layer is formed as a multilayered magnetic film.

9. A method according to claim 8, wherein the thin film magnetic head is a recording head, and further comprising the step of forming a recording/reproduction separation type magnetic head in which the recording head is utilized for writing information and a reproduction head is integrally formed therewith which is utilized for reading information.

10. The method according to claim 9, wherein the reproduction head is formed so as to include a ferromagnetic layer having magnetic resistive effect and an antiferromagnetic layer for allowing the ferromagnetic layer to show one-way anisotropy, and the antiferromagnetic layer is made of an Cr—Mn alloy.

11. The method according to claim 7, wherein when a saturable magnetic flux density of the second magnetic layer is denoted by Bs1 (Y), a film thickness by t($\mu$m), a saturable magnetic flux density of the fourth magnetic layer by Bs2 (T) and an overlapped length in the floating direction of the second and fourth magnetic layers by Dg ($\mu$m), the following relation is satisfied:

$$0.8 < Bs1 \times t / Bs2 \times Dg < 1.5.$$

12. The method according to claim 11, wherein the third magnetic layer is made of the same material as that of the first magnetic layer.

* * * * *